FIG. 8A.
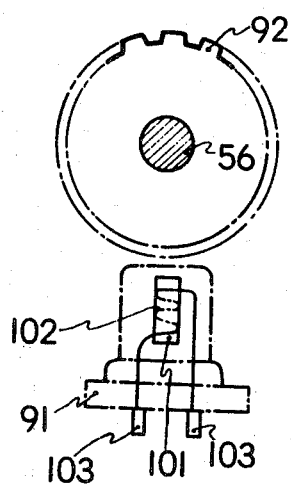
FIG. 8B.
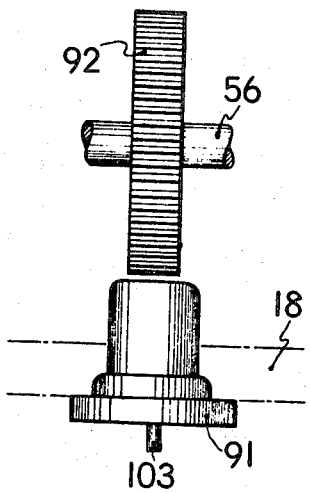
FIG. 9.
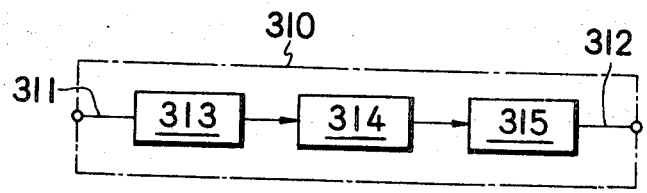
FIG. 10.
WAVE INPUT VOLTAGE (a)
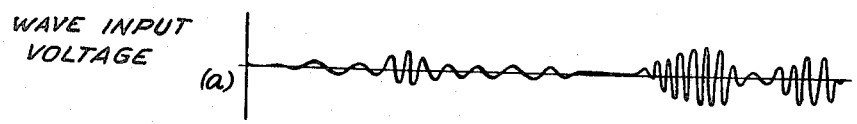
OUTPUT WAVE OF THE AMPLITUDE LIMITING CIRCUIT (b)
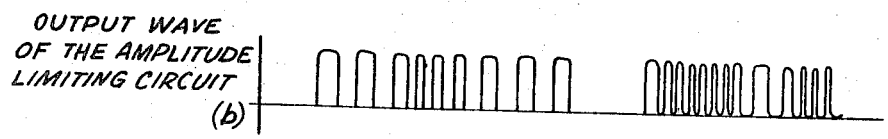
WAVE OUTPUT VOLTAGE (c)
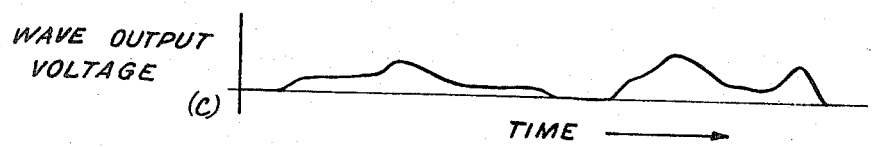
TIME →

United States Patent Office 3,572,168
Patented Mar. 23, 1971

3,572,168
AUTOMATIC TRANSMISSIONS
Takeaki Shirai, Nagoya-shi, Shigeru Sakakibara, Okada, Masaaki Noguchi, Nagoya-shi, and Masaharu Sumiyoshi, Toyota-shi, Japan; said Shirai assignor to Nippon Denso Kabushiki Kaisha and said Sakakibara, Noguchi, and Sumiyoshi assignors to Toyota Jidosha Kogyo Kabushiki Kaisha
Filed Sept. 5, 1969, Ser. No. 855,606
Claims priority, application Japan, Sept. 9, 1968, 43/64,809
Int. Cl. F16h 5/42
U.S. Cl. 74—752                                        10 Claims

ABSTRACT OF THE DISCLOSURE

The present invention relates to a system including computer activated signals for controlling the activation in a vehicle of an automatic transmission incorporating a hydraulic torque converter, a gear transmission unit and friction engaging means for selecting the appropriate gear of the gear transmission unit which is to be activated by fluid under pressure, characterized by the utilization of a slip ratio computing means for generating an electric output signal when the ratio of revolving velocity of the output shaft of the vehicle engine (input shaft of the hydraulic torque converter) to the revolving velocity of the output shaft of the torque converter or the power driven shaft of the gear unit reaches or is within a predetermined value.

SUMMARY OF THE INVENTION

The automatic transmission comprises a hydraulic torque converter, gear transmission, a friction engaging means for selecting the appropriate gearing of said gear transmission under certain conditions, a source of fluid under pressure, a conduit system connecting the source of fluid under pressure with the friction engaging means, a manual valve and an electrically activated valve respectively and collectively operable for selectively distributing fluid under pressure through said conduit system, a first detecting device for generating an electric signal in proportion to the revolving velocity of the input shaft of the hydraulic torque converter, a second detecting device for generating an electric signal in proportion to the revolving velocity of the output shaft of said hydraulic torque converter, a third detecting device for generating an electric signal in proportion to the revolving velocity of the output shaft of said gear transmission, an electrically computing circuit which generates an electric signal to instruct whether the electrically activated valve conductive or non-conductive for displacement by combining the ouput electric signal from the number of revolutions determining computations for (a) determining whether or not the revolving velocity of the input shaft of the hydraulic torque converter detected by said first detecting device is above a predetermined value; (b) the slip rate computation for detecting whether or not the revolution ratio of the input shaft to the output shaft of the hydraulic torque converter is above a predetermined value; (c) comparing the electric output of said first detecting device and that of the second said detecting device; (d) calculating the number of revolutions determining computation for detecting whether or not the revolving velocity of the output shaft of the gear transmission is above predetermined value and (e) selectively supplying or removing the fluid under pressure to and from said friction engaging means through said electrically activated valve when the same is rendered or conductive, thereby to select the gear of said gear transmission for desired activation of the vehicle.

DETAILED DESCRIPTION OF THE INVENTION

The present invention is characterized in that the slip rate of hydraulic torque converter is utilized as the main factor for determining the speed change point, and at the same time, a calculating function through the medium of an electronic circuit is introduced to dispatch the most appropriate speed-change instructions in respect of the particular speed change conditions; and the frictional engaging means of the transmission is then operated through the oil pressure operation circuit to effectuate the desired speed change.

The main object of the present invention is to effectuate correct speed change operations by using electric signals as the medium for selectively supplying fluid under pressure from the source of pressure fluid to the friction engaging means as the connection or the disconnection of certain of the friction engaging means is effectuated by the fluid under pressure introduced from the source of pressure fluid when the appropriate gearing of the gear-speed change mechanism of the automatic transmission is selected.

A further object of the present invention is to attain the selective connection or disconnection of the friction engaging means by the operation of the electrically operable distribution valve by said electric signals, said electrically operable distribution valve delivering fluid under pressure comprising a solenoid valve which together with a manually operable valve in the fluid pressure operation circuit, including said friction engaging means determine the speed change range.

A further object of the present invention is to operate said electrically operable distribution valve by generating an electric signal when the electrically computed revolving velocity ratio of the input shaft to the output shaft of the hydraulic torque converter included in the automatic transmission attains a predetermined value.

A furthre object of the present invention is to operate said electrically operable distribution valve by generating an electric signal when the electrically computed revolving velocity ratio of the input shaft of the hydraulic torque converter to the output shaft of said gear transmission attains a predetermined value.

A further object of the present invention is to generate the same electric signal for operating said electrically operable distribution valve when the revolving velocity ratio, computed respectively by using two computing circuits having different predetermined values of revolving velocity ratio, is above one of the predetermined values or below the other predetermined value.

A further object of the present invention is to operate said electrically operable distribution valve when the electric signal generated by the computation of said revolving velocity ratio aforementioned and the electric signal generated when the revolving velocity of the input shaft of said hydraulic torque converter attains a predetermined value, are simultaneously both present.

A further object of the present invention is to operate said electrically operable distribution valve when the electric signal generated by the computation of the aforesaid revolving velocity ratio and the electric signal generated when the revolution of said output shaft of the gear transmission attains a predetermined value, are both present.

A further object of the present invention is to operate said electrically operable distribution valve when the electric signal generated by the computation of the aforesaid revolving velocity ratio, the electric signal generated when the revolving velocity of said input shaft of hydraulic torque converter attains a predetermined value and the electric signal generated when the revolving velocity of said output shaft of the gear transmission arrives at a predetermined value, are all present.

Another object of the present invention is to operate said electrically operable distribution valve by combining the electric signal for indicating the position of the gears of the gear unit along with said generated electric signals referred to in the three previous paragraphs.

Other objects and advantages of the present invention will be made more appparent as this description proceeds particularly when considered in connection with the accompanying drawings, in which:

FIGS. 8A and 8B are diagrammatic showings of the structure of the r.p.m. (revolutions per minute) detecting device thereof;

FIG. 9 is a block diagram showing the structure of the r.p.m. computing circuit thereof;

FIG. 10 is a diagram showing the operation voltage wave of the r.p.m. computing circuit thereof;

The following are the detailed explanations with respect to embodiment of the present invention in accordance with the attached drawings, and in the following paragraphs what is cited as "pump member" stands for a pump forming part of the hydraulic torque converter, and in regard to the pump for producing the fluid pressure to operate the friction engaging means, the same may be referred to in the following paragraphs as "fluid pump" "oil pump" or "gear pump."

(1) The structure of forward two speed automatic transmission mechanism

Figure 1:
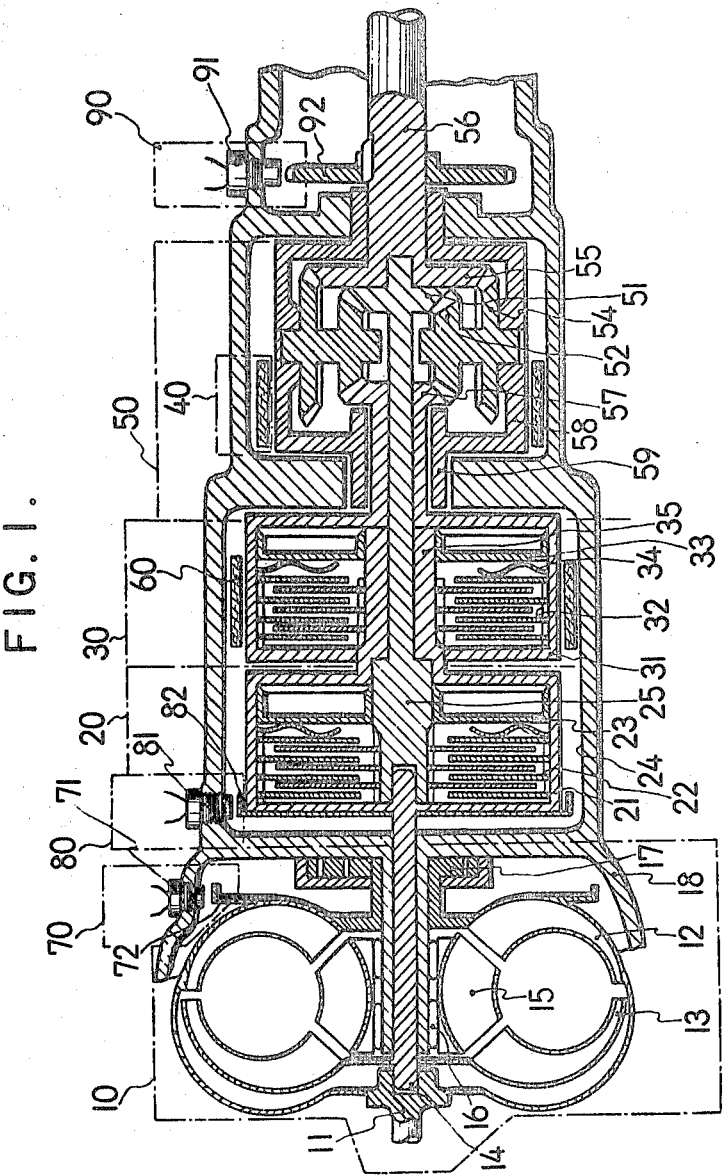
FIG. 1 is a cross sectional view of an embodiment of the automatic transmission of the present invention.

The transmission mechanism, as a typical example, comprises a forward two speed gear transmission mechanism with hydraulic torque converter as is shown in FIG. 1, although the present invention is not restricted to the two speed gear transmission mechanism, but may also be applied to three or more speed automatic transmission mechanisms.

The forward two speed automatic transmission mechanism with hydraulic torque converter of this embodiment, is composed of the hydraulic torque converter 10, the front clutch 20, the rear clutch 30, the rear brake 40, and the gear train 50.

The input side of the hydraulic torque converter is of such a structure that the output shaft of the internal combustion engine (not shown) is directly connected to the hydraulic converter shaft 11, which shaft is directly connected to the hydraulic torqne converter pump 12.

The hydraulic torque converter 10 is composed of the hydraulic torque converter pump 12 and the hydraulic torque converter turbine 13 faced against said pump 12, and a stator 15 having the one way clutch 16 is provided between said pump 12 and said turbine 13. Since the operations of these members are well known to those skilled in the art, therefore a detailed explanation with respect to these members is omitted here; except it is pointed out that the hydraulic torque converter pump 12 delivers a circulating flow, and the hydraulic torque converter turbine 13 transmits revolution to the turbine shaft 14 by means of momentum of said circulating flow.

In other words, revolution is transmitted from the hydraulic torque converter pump to the hydraulic torque converter turbine accompanied with the difference of revolutions hereinafter defined as "slip ratio."

When the difference of slip ratio is small, the transmitted torque is small and when the difference of slip ratio is great, the transmitted torque is also great, and the changing revolution ratios are transmitted and enter into the computations later described.

Oil pressure pump 17 is directly connected to the shaft 11 of hydraulic torque converter pump for the purpose described hereinafter.

The front clutch 20 is composed of the clutch drum 21 united to the hydraulic torque converter turbine shaft 14, multiple plate clutch 22, the clutch piston 23, the spring plate 24, and the clutch shaft 25, and when oil pressure is transmitted to the front clutch 20, the shaft 14 and the shaft 25 are connected by means of the clutch.

The rear clutch 30 is composed of the clutch shaft 35 united to the clutch drum 21, the clutch drum 31, the multiple plate clutch 32, the clutch piston 33, and the spring plate 34, and when oil pressure is transmitted thereto, the drum 21 and the drum 31 are connected by means of the clutch.

Figure 2:
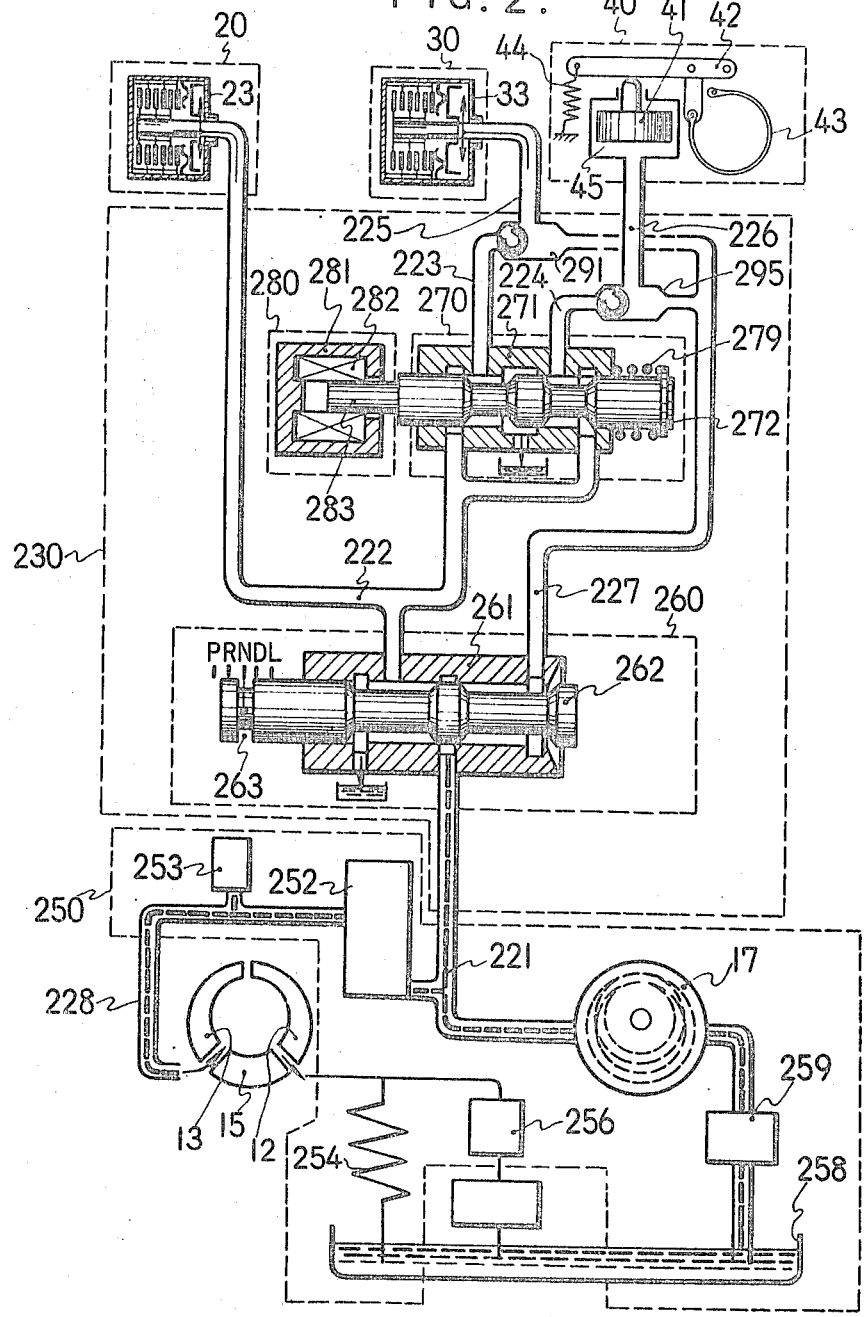
FIGS. 2, 3, 4 and 5 are the diagrams showing the operations of oil pressure operation circuit of an embodiment of forward two speed type transmission mechanism, illustrates conditions for respectively the N, DL, DH, and R states.

The rear brake 40 is comprised of the brake piston 41, the brake link 42, the brake band 43, the return spring 44, and the brake cylinder 45 as is shown in FIG. 2, and when oil pressure is transmitted thereto, the brake band 43 is operated to lock the carrier 58 of the gear train 50 against the housing 18 to stop revolution of the carrier.

The gear train 50 is a planetary bevel gear mechanism composed of the first sun gear 51, the second sun gear 57, the third sun gear 55, the first planet gear 52, the second planet gear 54, the output shaft 56 and the carrier 58.

The first sun gear 51 and the second sun gear 57 of said gear train 50 are geared to the first planet gear 52, and the second planet gear 54 is united to the first planet gear 52, and is geared to the third sun gear 55.

Said planet bevel gear mechanism as it is activated enters speed change gearing states as follows:

(High gear state) DH.—When the front clutch 20 and the rear clutch 30 are connected, the first sun gear 51 and the second sun gear 57 are revolved at the same revolution speed, and since the carrier 58 is free, the revolutions of the two sun gears become directly the output revolutions, and are transmitted at the relation of 1:1. (See FIG. 1 of the drawings.)

(Low gear state) DL.—When the front clutch 20 and the rear brake 40 are connected, the input revolution is transmitted to the first sun gear 51, and at the same time the carrier 58 is restrained from movement by means of the rear brake 40, and since the second sun gear 57 is free, the output revolution is $1/K$ of the input revolution. (K is the speed change ratio.)

(Reverse state) R.—When the rear clutch 30 and the rear brake 40 are connected and the input revolution is transmitted to the second sun gear 57, and the first sun gear 51 is free, and the carrier 58 is restrained from movement by means of the rear brake 40, the revolution of the output shaft 56 is reversed, and the revolution of the output shaft is $1/K$ of the input revolution.

(2) R.p.m. detector

The detector 70 for detecting the number of revolutions of the shaft 11 of the hydraulic torque converter pump is composed of the revolution detector 71 (which is described in detail hereinafter) provided on the housing 18 and the toothed disc 72 provided on the hydraulic torque converter pump 12, and when the number of the teeth of the toothed disc 72 is set to be $n_1$ (for example $n_1=32$), electric signal $S_1$ which is $n_1$ times, the number of revolutions $N_1$ of the shaft 11 of the hydraulic torque converter pump 12 can be obtained at the revolution detector 71.

The shaft of the internal combustion engine and the shaft 11 as hereintofor indicated are connected, and therefore the detection of said electric signal is the detection of the number of revolutions (r.p.m.) of the internal combustion engine so that $(S_1=n_1N_1)$.

The detector 80 for detecting the number of revolutions (r.p.m.) of the shaft 14 of hydraulic torque converter turbine is composed of the revolution detector 81 (which can be of the same structure as the detector 71) provided on the housing 18, and the toothed disc 82 (which can be of the same structure as the toothed disc 72), the toothed disc 82 being provided on the front clutch drum 21 which is united to the shaft 14 of the hydraulic torque converter turbine 13, and when the number of the teeth thereof is set at $n_2$ (for example $n_2=32$), the electric signal $S_2$ which is $n_2$ times the number of revolutions (r.p.m.) $N_2$ of the shaft 14 can be detected by the revolution detector 81 $(S_2=n_2N_2)$.

In regard to the detection of the number of revolutions (r.p.m.) of the shaft 14 of the hydraulic torque converter turbine, the value obtained at another position shown as the detector 90 for detecting the number of revolutions (r.p.m.) of the output shaft 56 for example, can be substituted for the value detected by the detector 80, it being within the revolution of the shaft 14 of the hydraulic torque converter turbine to attain the object of the present invention.

The detector 90 for detecting the number of revolutions (r.p.m.) of the output shaft 56 of the gear train is composed of the revolution detector 91 (which can be of the same structure as those detectors 71, 81), and the toothed disc 92 united to the output shaft 56, and when the number of teeth thereof is set to be $n_3$ (for example $n_3=32$), electric signal $S_3$ which is $n_3$ times the number of revolutions (r.p.m.) $N_3$ of the output shaft 56 can be obtained at the revolution detector 91 $(S_3=n_3N_3)$.

When the speed change ratio is set to be K, such a relation as is shown by the following formula can be obtained between $S_2$ and $S_3$.

$$S_2 = K \frac{n_2}{n_3} S_3$$

or $$\left(S_3 = \frac{n_3}{n_2 K} S_2\right)$$

where $K=N_2/N_3$ (speed change ratio).

In other words, it will be understood that the number of revolutions $N_2$ of the shaft 14 of the hydraulic torque converter turbine 13 can be obtained from the number of revolutions $N_3$ of the output shaft 56 through the above calculation formulae.

By ascertaining the number of revolutions $N_3$ of the output shaft 56, the running state of the vehicle may be obtained, i.e., the car speed, and by ascertaining the number of revolutions $N_1$ of the shaft 11 of the hydraulic torque converter pump 12, the number of revolutions of the internal combustion engine may be obtained.

On the other hand, by ascertaining the number of revolutions of the shaft 14 of hydraulic torque converter turbine 13 we may obtain the revolution ratio of the shaft 11 of the hydraulic torque converter pump 12 and the shaft 14 of the hydraulic torque converter turbine 13, and thereby obtain the slip ratio of the hydraulic torque converter, and as a result one may obtain the transmitted torque of the hydraulic torque converter.

In the following paragraphs, the structure of detectors 70, 80 and 90 are explained by taking as an example the detector 90 for detecting the number of revolutions of the output gear shaft 56 in accordance with the showing in 8A and 8B.

The toothed disc 92 whose revolution center is fixed onto the output shaft 56, is a round plate made of magnetic material having 32 teeth formed on the periphery thereof with equal intervals between said teeth as is apparent from the side view thereof illustrated in FIG. 8A, and the revolution detector 91 being disposed on the housing 18 at a position close to the outside in the diametrical direction thereof.

The revolution detector 91 is composed of the permanent magnet 101 and the coil 102 wound therearound, and these are contained in an appropriate casing made of non-magnetic material, and the permanent magnet 101 is fixed into the speed change gear housing by said casing in such a manner that the end portion of the permanent magnet 101 can be placed close to the outer periphery of the toothed disc 92.

When the toothed disc 92 is revolved and the toothed portion thereof passes by the magnetic field of the permanent magnet 101, the leakage flux of the permanent magnet 101 is changed and an electromotive force is generated in the coil 102 with 103 representing the output terminal.

In the case as shown in FIG. 8A, 32 pulses of voltage signals can be generated by one revolution of the toothed disc 92.

Generally speaking, the voltage signal generated when the number of revolutions of the toothed disc, the number of the teeth thereof being $n_3$, is $N_3$ for a predetermined period of time, can be obtained by the voltage $S_3$ of the value of $n_3$ times $N_3$.

The toothed discs 72, 82 respectively in the detector 70 for detecting the number of revolutions of the shaft 11 of the hydraulic torque converter pump 12, and the detector 80 for detecting the number of revolutions of the shaft 14 of the hydraulic torque converter turbine 13 are respectively the same as the toothed disc 91 insofar as the outer peripheral forms thereof are concerned, but are different only in the method for attaching the same to the hydraulic torque converter turbine 13 or the clutch drums.

Figure 7:
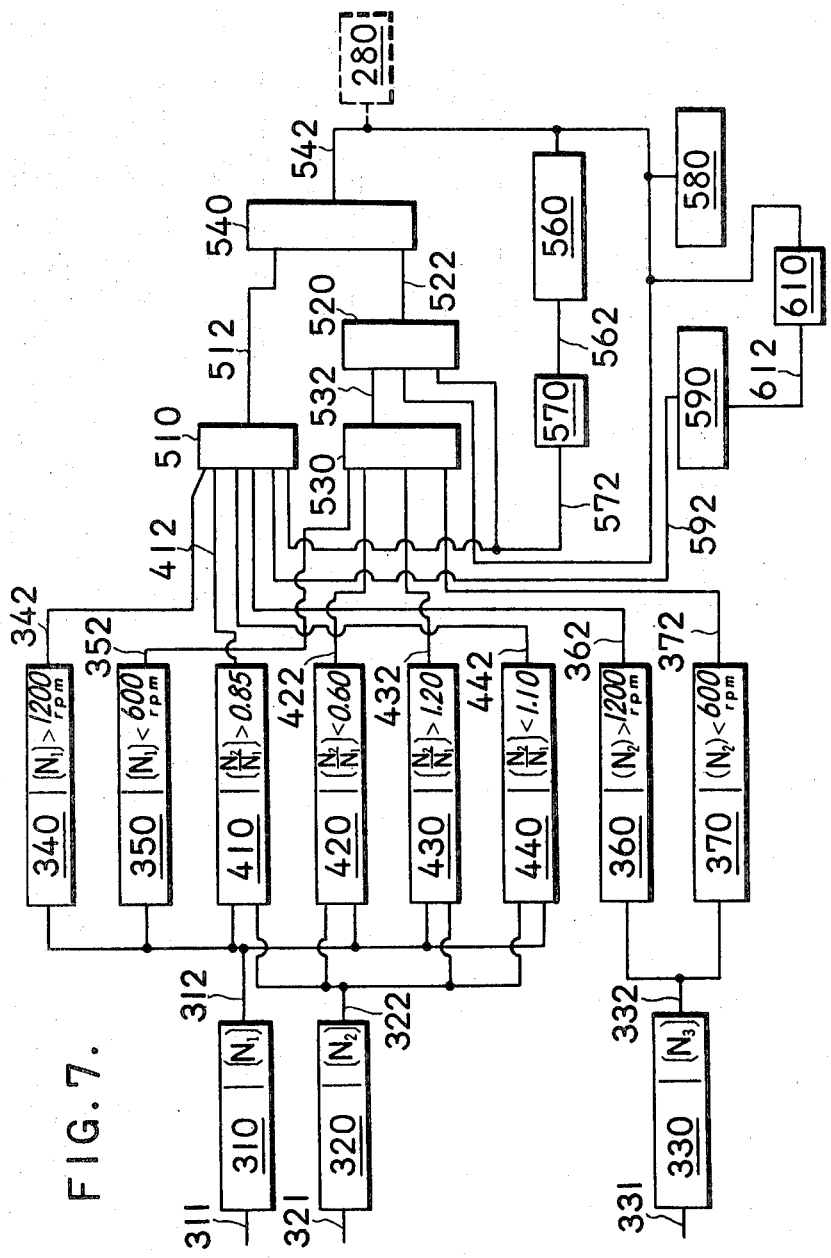
FIG. 7 is a block diagram showing the structure of the electronic computing circuit as an embodiment of the present invention.

The output signal voltages $S_1$, $S_2$, $S_3$ of the three detectors 70, 80, 90 for detecting the number of revolutions are respectively introduced into the lines 311, 321, 331, as shown in FIG. 7.

The second point of the present invention resides in that the respective number of revolutions are detected as electric signals, and the respective number of revolutions and revolution ratio are electronically computed from the electric signals to transmit speed change signals through logic circuitry, to the oil pressure operation of fluid circuit 230 as illustrated in FIGS. 2 through 5, thus in accordance with the predetermined speed change pattern, the speed of the gear train 50 can be changed by said operation of fluid circuit 230.

(3) Oil pressure operation circuit

The structure of the oil pressure operation circuit when the present invention is applied to the forward two speed automatic transmission, is shown in FIGS. 2, 3, 4, and 5, and it can be classified into the oil pressure source 250 and the fluid operation circuit 230, and the operation circuit 230 is composed of the manual valve 260, the electrically operated selective distribution valve 270, the solenoid 280, the check valves 291 and 295 and the oil paths.

The oil pressure source 250 is composed of the toil pressure pump 17, the oil filter 259, the oil pan 258, the pressure control valve 256, the pressure control valve 252, the relief valve 253, and the oil cooler 254, and said oil pressure source 250 has the function to supply hydraulic torque converter operation oil, gear lubricant oil and oil under pressure for said oil pressure operation circuit.

These specific elements of an oil pressure circuit are well known to those skilled in the art and therefore the explanations thereof are omitted here.

The manual valve 260 is composed of the valve shaft 262 and the valve box 261, and the valve shaft 262 is moved interlockingly by shifting the control lever (not shown) to the positions of P, R, N, D, L (which are generally known gearing positions; wherein P stands for parking; R stands for reverse; N stands for neutral; D stands for drive; and L stands for low gear), and the positions of P, R, N, D, L, shown in FIG. 2 are the positions of the valve shaft 262 operated in relation thereto, the groove 263 on the left end portion of the valve shaft 262 being the groove for inserting the connecting link from the manual control lever (not shown).

When the manual valve 260 is on N position, as is shown in FIG. 2, the oil path 221 is closed, and the oil paths 222, 227 are opened (by "opened" is meant that no fluid passes through the paths specified).

Figure 3:
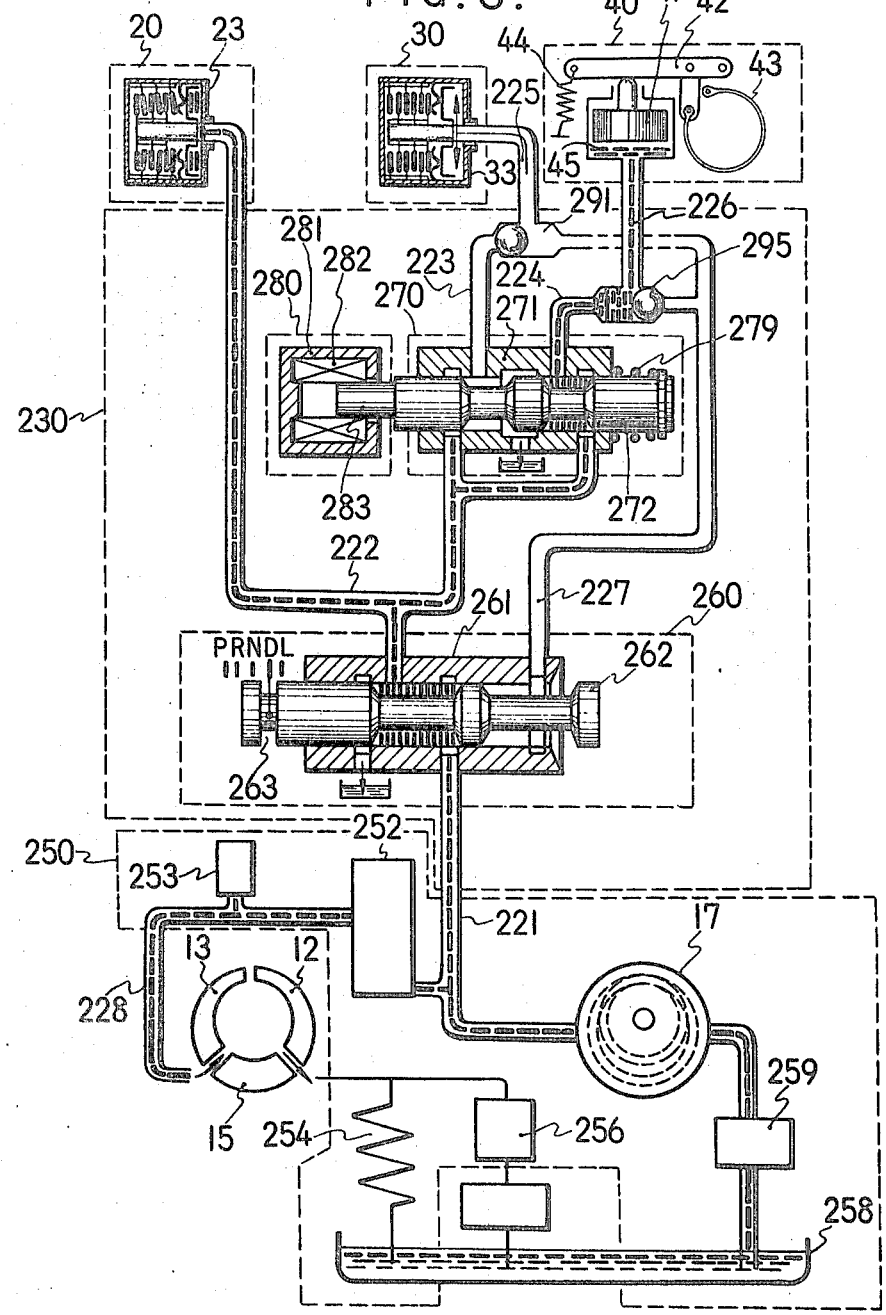

When the manual valve 260 is placed on L position (not shown), the oil paths 221, 222 are connected in the same manner as in the state of D, L positions shown in FIG. 3, and the oil path 227 is opened. In this case, however, the solenoid 280 is not conductive since current does not pass through the coil 282.

Figure 4:
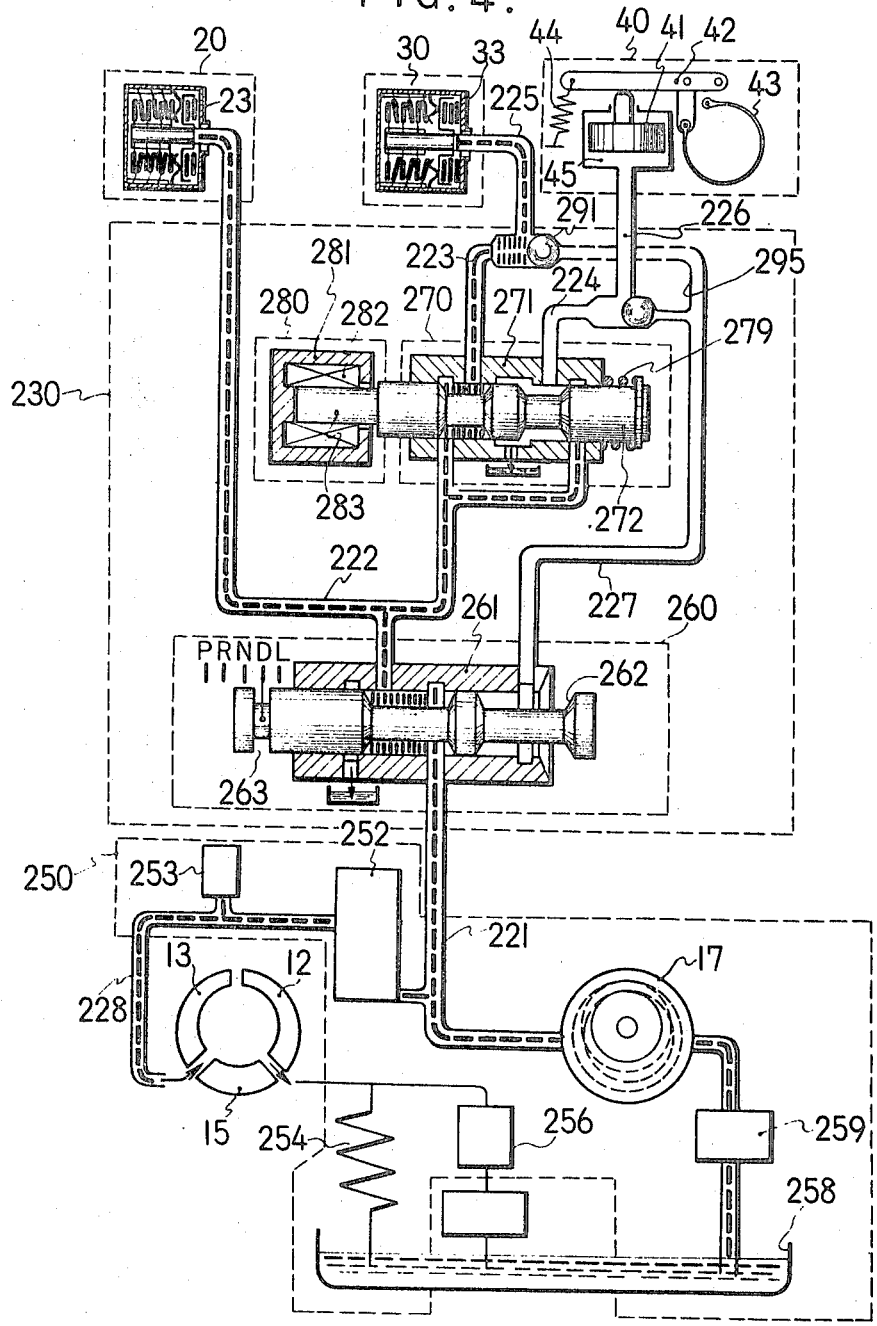

When the manual valve 260 is placed on position D, as is shown in FIGS. 3 and 4, the oil path 221 and 222 are connected, and the oil path 227 is opened, thus defining the DL state. When the solenoid 280 is conductive, the current passes through coil 282 and the transmission attains the DH state, later described in detail.

Figure 5:
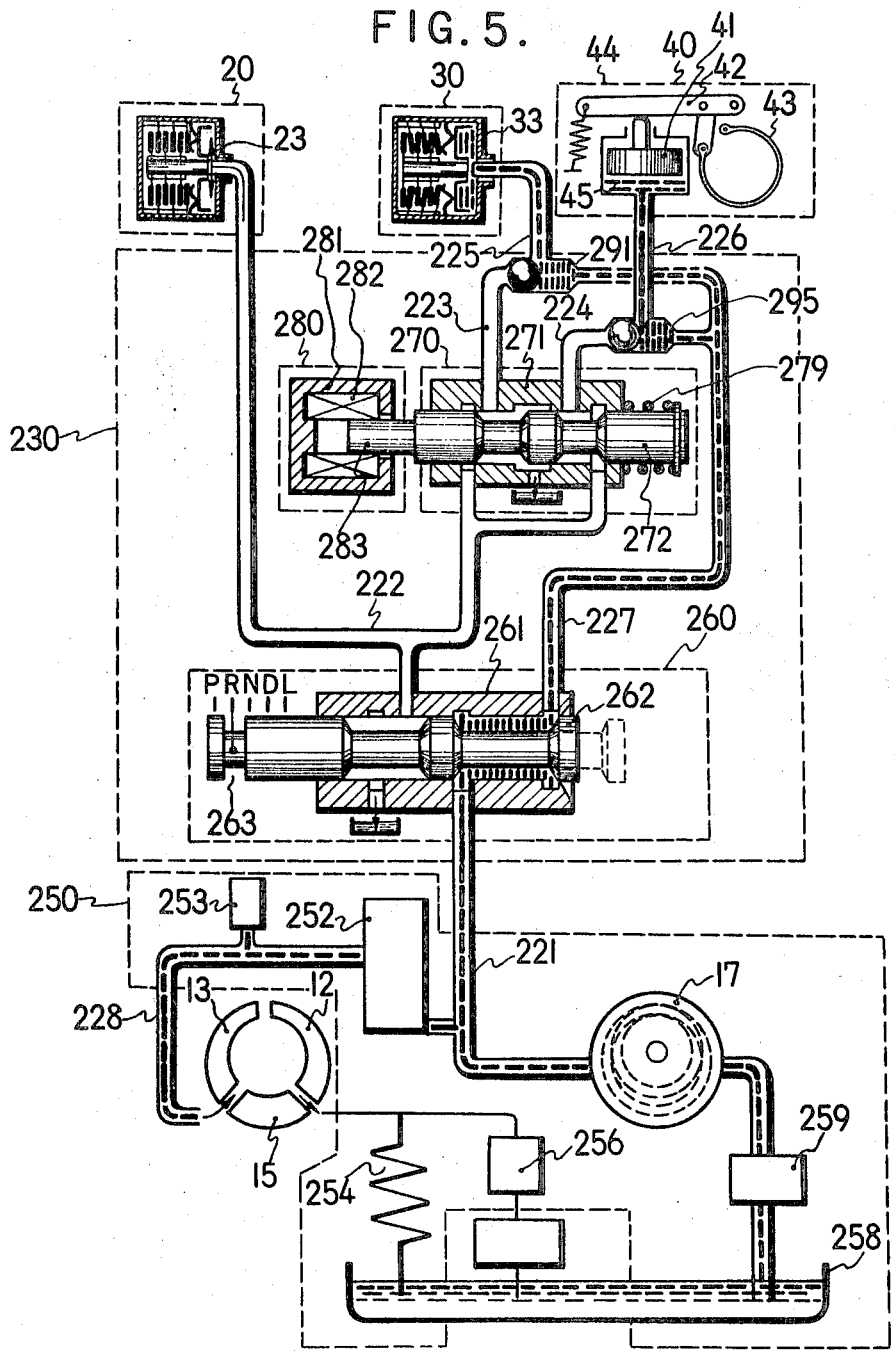

On the other hand, when the manual valve is placed on position R, as is shown in FIG. 5, the oil path 221 and 227 are connected, and the oil path 222 is opened.

When the manual valve is placed on position P, the oil path 221 is closed, nad oil paths 222 and 227 are opened (as shown in FIG. 2).

The shift valve 270 has the valve box 271 and the valve shaft 272, and one end of the valve shaft 272 (the left end in the diagram) is connected to the moving core 283 of the solenoid 280.

When the solenoid 280 is not conductive, the valve shaft 272 is set to the right by means of the spring 279 connected to the other end (the right end in the drawing) of said valve shaft 272, and the oil path 222 and the oil path 224 are connected, and the oil path 223 is opened (see FIG. 3).

On the other hand, when the solenoid 280 is conductive, it is moved to the left, and the oil path 222 and the oil path 223 are connected, and the oil path 224 is opened (see FIG. 4).

When the operation oil pressure is in effect in the oil path 223, the check valve 291 connects said oil path 223 to the oil path 225, and closes the oil path 227.

When the operation oil pressure is in effect in the oil path 227, the check valve 291 connects said oil path 227 to the oil path 225, and closes the oil path 223 (see FIGS. 3 and 4).

When the operation oil pressure is in effect in the oil path 224, the check valve 295 connects said oil path 224 to the oil path 226 and closes the oil path 227.

When the operation oil pressure is in effect in the oil path 227, the check valve 295 connects said oil path 227 to the oil path 226 to close the oil path 224 (see FIGS. 3 and 4).

When current is passed through the coil 282 of the solenoid 280, the moving core 283 is attracted and moved to the left (along with the valve shaft 272 of the shift valve 270) (see FIG. 4), and when current is not passed therethrough, the moving core 283 is returned back to the right side (see FIG. 3).

While the solenoid 280 is illustrated as the electrical actuator in the various embodiments, it is within the spirit of this invention to provide other types of actuator devices for converting an electric signal into a mechanical displacement.

The speed ratio of the gear train 50 can be changed into the respective states of N, D, L, R, P by the above-mentioned oil pressure elements, as is outlined in more detail in the following paragraphs:

(1) N state.—As is shown in FIG. 2, the operative oil pressure is cut off by the manual valve 260, and all conduit paths to the actuators of the front clutch, the rear clutch, and the rear brake are opened so that the actuators of the friction engaging means do not operate. The hydraulic torque converter turbine shaft 14 is freely revolved, and the vehicle does not run.

In the drawings the conduit paths showing thick dotted lines indicate that operation oil under pressure is passing therethrough to the appropriate friction engaging means.

(2) D state.—There are two states in the D designation, i.e., DL state and DH state. In other words, the DL state shows the low gear state of the D designation, and DH state shows the high gear state of the designation.

DL state.—As is shown in FIG. 3, the valve shaft 272 of the shift valve 270 is disposed at the right, and the valve shaft 262 of the manual valve 260 is placed on D position, and the solenoid is nonconductive, the operation oil under pressure is supplied to the conduit paths 221, 222, 224 and 226 to apply fluid under pressure to the front clutch 20 and the rear brake 40; in this instance the rear clutch 30 is opened, and thereby the gear train of the vehicle is in the low gear state.

DH state.—As is shown in FIG. 4, the valve shaft 262 of the manual valve 260 is in D position, and the valve shaft 272 of the shift valve 270 is disposed at the left, the solenoid 280 being conductive and the operation oil under pressure is supplied to the oil paths 221, 222, 223 and 225 to apply fluid pressure to the front clutch 20 and the rear clutch 30, and in this instance the rear brake 40 is opened, and thereby the gear train 50 of the vehicle is in high gear state.

(3) L state.—L state is attained when the valve shaft 262 of the manual valve 260 is disposed in L position, and the valve shaft 272 of the shift valve 270 is placed on the right position, the solenoid 280 is not conductive, the operation oil under pressure passes through the same oil paths as in FIG. 3 and pressurizes the front clutch 20 and the rear brake 40, and the rear clutch 30 is opened and thereby the gear train 50 of the vehicle is in low gear state.

(4) R state.—As is shown in FIG. 5, the valve shaft 262 of the manual valve 260 is disposed on R position, and the valve shaft 272 of the shift valve 270 is disposed at the right. In this instance, the operation oil under pressure passes through the oil paths 221, 227, 225, 226, and applies fluid pressure to the rear clutch 30 and the rear brake 40; the front clutch 20 is opened so that the gear train 50 of the vehicle is in reverse (R) state.

(5) P state.—The P state of the vehicle may be attained when the valve shaft 262 of the manual valve is placed on P position, and the valve shaft 272 of the shift valve is disposed on the right side, and the operation oil under pressure is cut off by the valve shaft 262 in the same manner as in N state in FIG. 2, and all the actuators of the friction engaging means are opened.

Although it is not shown in the diagram, the parking device interlocked to the manual valve 260 is provided on P position, and the output shaft 56 is mechanically fixed as is known to those skilled in the art.

Thus, the automatic transmission carries out automatically the speed change of DH and DL and it can be performed by rendering the solenoid 280 conductive and not conductive.

The speed change range in which conductivity or non-conductivity to the solenoid is carried out at the speed change point is delineated in the following paragraphs.

(4) Speed change range

As described before, the state of the internal combustion engine can be obtained from the number of revolutions $N_1$ of the shaft 11 of hydraulic torque converter pump, the state of the hydraulic torque converter can be obtained from the slip ratio, and the running state of the vehicle can be obtained from the number of revolutions $N_3$ of the output shaft 56, and therefore the speed change point required of the vehicle can be determined thereby.

(A) Control of the number of revolutions of internal combustion engine.—Generally speaking, an internal combustion engine cannot produce smooth revolutions when the number of revolutions is below a certain point, and therefore when speed change is effectuated from low gear state into the high gear state, it is preferable that speed change be effectuated at a low number of revolutions of the combustion engine shaft; hence, in such case, speed change must be effectuated above a minimum number of revolutions specific to said internal combustion engine.

In carrying out the speed change from the high gear state into the low gear state, it is preferable to maintain the combustion engine revolution at low value, i.e., until the number revolutions is reduced to an effective low range.

(B) Control of car speed.—When a vehicle in particular an automobile, changes speed from low gear state into high gear state, it is preferable not to effectuate engine revolution (the vehicle speed) at too low value while the vehicle is in high gear state, since acceleration cannot satisfactorily be developed as desired at low vehicle speed for change from the lower to the higher gear state.

When a vehicle is driven from high gear state into low gear state, it is preferable not to drive in low gear state because of the noise or vibrations, and therefore it is preferable to drive the vehicle in high gear state until the vehicle runs at as low speed as possible.

(C) Control of slip ratio.—In the torque transmission of hydraulic torque converter, the transmission efficiency is affected considerably, depending on the case where the slip ratio (the slip ratio value can be represented by $N_2/N_1$) is less than the value close to 1 and the case where the slip ratio is greater than that of the aforesaid value.

In other words, in the former case, the torque is transmitted to the output shaft 56 from the internal combustion engine, and in the latter case, the output shaft 56 transmits torque for driving the internal combustion engine.

Following is the explanation with respect to the above-mentioned two cases.

(C-1) The case in which the hydraulic torque converter transmits torque to the output shaft 56 from the internal combustion engine.—This is the state of the ordinary running or the hill climbing of the vehicle.

When speed change is carried out from low gear state into high gear state, it is preferable to carry out the speed change in such a range that the slip ratio is close to 1 in order to utilize the performance of hydraulic torque converter.

Figure 6A:
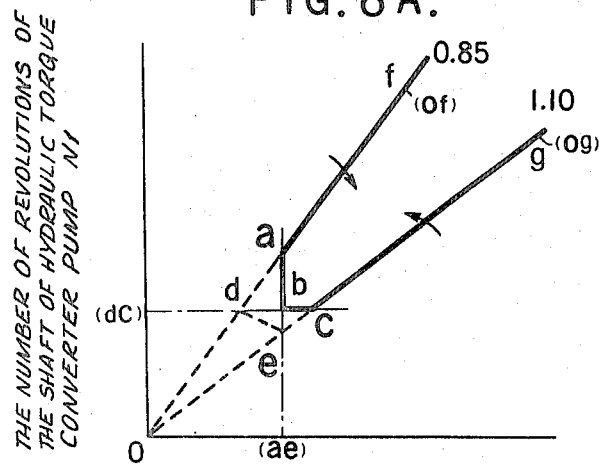
FIGS. 6A, 6B and 6C are diagrams showing examples by way of graphs of the speed change range.

The range of the slip ratio is from 0.5 to 1.00 in most cases, and in the case shown in FIG. 6A where the present invention is applied to forward two speed automatic transmission, the speed change point is determined to be 0.85.

When speed change is intended to be carried out from high gear state into low gear state, it is preferable to carry out the speed change when the slip ratio is of a value lower than 0.85 and in this instance to utilize the performance of hydraulic torque converter.

The range of speed change, determined by the performance of hydraulic torque converter, has the upper limit of slip ratio, and the upper limit is about 0.9, and in this example (see FIG. 6B) the slip ratio is 0.60.

(C-2) The case in which the hydraulic torque converter transmits torque from output shaft 56 to the internal combustion engine.—This case can be divided into two running states, i.e., (1) the running state at reduced speed which is generally called the engine brake state, and (2) the accelerated running state as in down slope movement.

When it is necessary to carry out speed change from low gear state into high gear state, it is required to gradually accelerate in the running state, and in such case it is preferable to carry out the speed change at the slip ratio close to 1.

In other words, the range of speed change is restricted to preferable slip ratio in the neighborhood of the slip ratio of 1.00 as is determined from the performance of hydraulic torque converter, and the range of the slip ratio is within the range from 0.9 to 1.3, and in case shown in FIG. 6A, the speed change point is determined to be 1.10.

When it is necessary to carry out speed change from high gear state into low gear state, when strong braking is required in the running state for abrupt reduction of speed, or for speed control in down movement, there is a tendency that the slip ratio reaches a higher value than 1. In such case, it is necessary to use the engine brake by carrying out speed change into low gear state as quickly as possible before the slip ratio becomes too high.

Figure 6B:
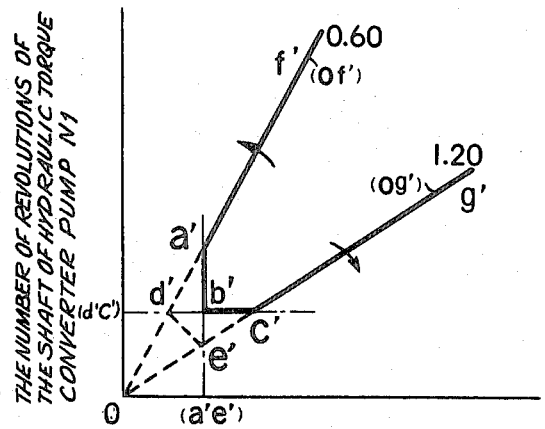

In other words, the range of speed change is restricted to the slip ratio above a definite value determined by the performance of hydraulic torque converter, where the range of speed change may have an lower limit of slip ratio in the range of 1.00 as determined by the revolution of hydraulic torque converter and in case as illustrated in the showing of FIG. 6B it is determined to be 1.20.

As has been described in the preceding paragraphs, with respect to the conditions for carrying out speed change from low gear state to high gear state, there are four kinds of restrictions on speed change, i.e., the number of revolutions of internal combustion engine, car speed, the slip ratio when torque is transmitted from the internal combustion engine to the output shaft 56, and the slip ratio when torque is transmitted from the output shaft 56 to the internal combustion engine, and when all the conditions beyond said restrictions develop (see arrows of FIG. 6A) it is geared into high gear state.

As the conditions for speed change from high gear state to low gear state, there are four kinds of restrictions on speed change, i.e., the number of revolutions of internal combustion engine, car speed, the slip ratio when torque is transmitted from the internal combustion engine to the output shaft 56, and the slip ratio when torque is transmitted from the output shaft 56 to the internal combustion engine, and when a condition beyond said restrictions develops (see arrows of FIG. 6B), it is geared into low gear state. The four kinds of restrictions on speed change are respectively independent conditions, and when any of said conditions develop, speed change can be carried out.

The above are the explanations as to the conditions of vehicle speed, which may be detected by the number of revolutions $N_3$ of the output shaft 56 as mentioned heretofore, and when the detected number of revolutions is computed into the number of revolutions $N_2$ of hydraulic torque converter turbine shaft in accordance with the above-mentioned calculation formulae, the same may be represented as the diagram on a plane, and therefore explanation is given herein by using the value computed into the number of revolutions $N_2$.

The above are the explanations about the speed change restrictions, and the actual speed change can be carried out under the most preferable conditions within said restrictions by using the most preferable speed change point (or line) determined by the performance of the internal combustion engine, the performance of hydraulic torque converter and the performance of the vehicles. The above is more specifically delineated by the engine vehicle, as is shown in FIG. 6.

(I)

The number of revolutions of the internal combustion engine as speed change point (or line) from low gear state into high gear state—1200 r.p.m. (constant)

The number of revolutions of the output shaft 56 (corresponding to the car speed) (the computed value in $N_2$)—1200 r.p.m. (constant)

Slip ratio when torque is transmitted to the output shaft 56 from the internal combustion engine—0.85 (constant)

The slip ratio when torque is transmitted from the output shaft 56 to the internal combustion engine—1.10 (constant)

These values may be represented by the straight lines ($dc$), ($ae$), ($of$) and ($og$) (see FIG. 6A).

The above given values are the speed change points (or lines), and speed change is carried out in the speed change range beyond the above given values.

In other words, speed change is carried out when the the values therefore are within the range surrounded by points $f$, $a$, $b$, $c$ and $g$, and the connecting lines therebetween of the diagram.

In this case, the range within the area by the points (or the lines connecting the same), viz. $a$, $b$, and $d$, or the points $b$, $c$, and $e$, can also satisfy the conditions, and the same may be considered as the speed change range.

It is within the spirit of the invention that the range within the points (and the lines connecting the same) $d$, $b$, and $e$ can also be used as speed change range.

(II)

The number of revolutions of the internal combustion engine as the speed change point (or line) from high gear state into low gear state—600 r.p.m. (constant)

The number of revolutions of the output shaft (corresponding to the car speed) (computed value in $N_2$)—600 r.p.m. (constant)

Slip ratio when torque is transmitted from the internal combustion engine to the output shaft 56—0.6 (constant)

The slip ratio when torque is transmitted from the output shaft 56 to the internal combustion engine—1.20 (constant)

which are shown by the straight lines ($d'c'$), ($a'e'$), ($of'$) and ($og'$) (see FIG. 6B).

Therefore, speed change is carried out when the values therefore are beyond the range surrounded by $f'$, $a'$, $b'$, $c'$, and $g'$ in the diagram.

The above given conditions may also be satisfied beyond the range surrounded by the points $a'$, $b'$ and $d'$, and the points $b'$, $c'$ and $e'$, and therefore it can be used as speed change range.

Furthermore, one can effectuate the speed change beyond the range surrounding the points $d'$, $b'$, and $e'$ without departing from the spirit of the present invention.

Figure 6C:
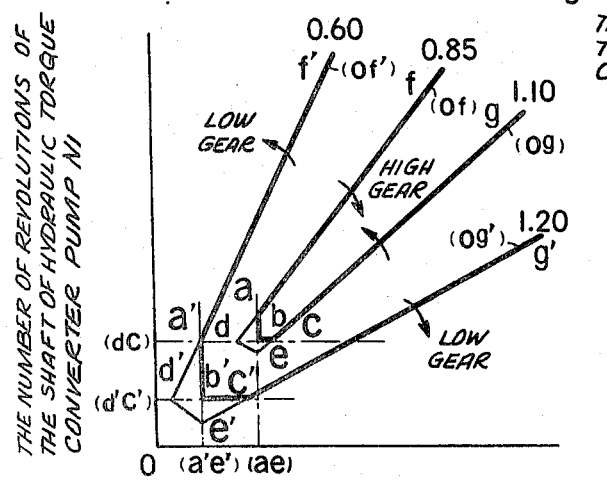

FIG. 6C is a diagram in which the speed change points (or lines) from low gear state into high gear state are represented by solid line, and the speed change points (or lines) from high gear state into low gear state are represented by a dotted line.

In this example, the speed change points (or lines) are shown by straight lines in FIGS. 6A, B, but it is sometimes preferable to use the speed change points (or lines) in the form of a curve, which is within the spirit of the present invention.

The electronic computing circuit for making speed change signals when speed change is carried out in accordance with the speed change points (or lines) shown in FIG. 6C is delineated in the following paragraphs.

(5) Electronic computing circuit

The electronic computing circuit for determining the speed change point (or line) is composed of the hydraulic torque converter pump shaft 11, hydraulic torque converter turbine shaft 14, the computing circuits 310, 320, 330 for computing the number of revolutions of the output shaft 56, four slip calculating counter circuits (410, 420, 430, 440), four computing circuits (340, 350, 360, 370), for determining the number of revolutions, two AND-circuits (510, 520), and OR-circuit (530), a bistable memorial circuit (540), the synchronous time retaining circuit (560), and two NOT-circuits (570, 610), and two gear position circuits (580, 590), as is shown in FIG. 7.

The expression "signal" which is referred to in the following paragraphs, stands for the direct current of positive polarity with the direct current of negative polarity being grounded, unless otherwise specified.

When the manual control lever is placed in D position, the electronic computing circuit is in condition for commencement of computation functions and the computing circuit is connected to a source of electricity (not shown) by means of the switch (not shown).

Referring to FIG. 7, the input introduced from line 311 into circuit 310 for computing the number of revolutions of the hydraulic torque converter pump shaft 11, is the output voltage $S_1$ of the detector 70 for detecting the number of revolutions of the hydraulic torque converter pump shaft 11, and the output signal designated as the electric signal [$N_1$] indicates the number of revolutions of the hydraulic torque converter pump shaft 11, said signal [$N_1$] being led out through the line 312; the electric signal in the following description for showing the number of revolutions is bracketed as [ ].

The input introduced from line 321 into the computing circuit 320 for computing the number of revolutions of the hydraulic torque converter turbine shaft 14 is the output voltage $S_2$ of the detector 80 for detecting the number of revolutions of the hydraulic torque converter turbine shaft 14, and the output signal led out through line 322 from computing circuit 320, is the electric signal [$N_2$] showing the number of revolutions of the hydraulic torque converter turbine shaft 14.

The input introduced from line 331 to the computing circuit 330 for computing the number of revolutions of the output shaft 56 is the output voltage $S_3$ of the detector 90 which detects the number of revolutions of the output shaft 56, and the ouput signal thereof led out through line 332 of computing circuit 330 is the electric signal [$N_3$] showing the number of revolutions of the output shaft 56.

The input signal introduced from line 312 into the computing circuit 340 for determining the number of revolutions ($[N_1]>1200$ r.p.m.) is $[N_1]$, and the output signal from circuit 340 is the electric signal showing ($[N_1]>1200$ r.p.m.), which is led out through the line 342.

In the same manner, the inputs of the computing circuit 350 for determining the number of revolutions ($[N_1]<600$ r.p.m.), the computing circuit 360 for determining the turns of rotation ($[N_2]>1200$ r.p.m.), and the computing circuit 370 for determining the number of revolutions ($[N_2]<600$ r.p.m.) are respectively designated as $[N_1]$, $[N_2]$, $[N_3]$, and are introduced from the lines 312, 322, and 332, and the outputs from the respective computing circuits 350, 360 and 370 are the electric signals showing ($[N_1]<600$ r.p.m.), ($[N_2]>1200$ r.p.m.), and ($[N_2]<600$ r.p.m.) which are respectively led out through the lines 352, 362, 372.

$[N_2]$ is a value obtained by computing $[N_3]$ in the number of revolutions of the hydraulic torque converter turbine shaft 14.

The inputs of the slip computing circuit $$[N_2/N_1]>0.85$$

410 are two signals $[N_1]$ and $[N_2]$ and they are respectively introduced from the lines 312 and 322.

On the other hand, the output thereof is the signal (voltage) showing the result of computation of $$[N_2/N_1]>0.85$$

and is led out through the line 412.

In the same manner, the inputs of the slip computing circuits 420, 430, and 440 are two signal voltages $[N_1]$ and $[N_2]$ and are introduced from the lines 312 and 322.

The output signals thereof are the signals (voltage) which show respectively the results of the computation of $$[N_2/N_1]<0.60$$

($N_2/N_1]>1.20$), ($N_2/N_1]<1.10$), and are led out through the lines 422, 432, and 442 respectively.

The inputs of the AND-circuit A 510 are respectively the output signals of the computing circuit 340 for determining the number of revolutions ($[N_1]>1200$ r.p.m.), the slip computing circuit ($[N_2/N_1]>0.85$) 410, the slip computing circuit ($[N_2/N_1]<1.10$) 440 the computing circuit 360 for determining the number of revolutions ($[N_2]>1200$ r.p.m.), the signal of the low gear position 590, and the signal of the NOT-circuit B 570, and are respectively introduced from the lines 342, 412, 442, 362 and the lines 592, 572. The output signal thereof is the signal (voltage) for showing the result of the computation of AND-circuit, and is led out through the line 512.

The inputs of the AND-circuit B 520 are the signals introduced through the lines 532, 542, 572, and the output signal (voltage) is led out through the line 522.

The inputs of the OR-circuit 530 are the signals (voltage) introduced through the lines 352, 422, 432, 372, and the output signal (voltage) is led out through the line 352.

The inputs of the bistable memorial circuit 540 are the signals (voltage) introduced through the lines 512 and 522, and the output signal (voltage) is led out through the line 542.

The input of the synchronous time retaining circuit 560 is the signal (voltage) introduced from the line 542, and the output signal (voltage) is led out through the line 562.

The input of the NOT-circuit A 610 is the signal (voltage) introduced from the line 542, and the output signal (voltage) is led out through the line 612.

The input of the NOT-circuit B 570 is the signal (voltage) introduced from the line 562, and the output signal (voltage) is led out through the line 572.

The input signal of the high gear position 580 is the signal (voltage) introduced from the line 542. The input signal of the low gear position 590 is the signal (voltage) introduced from the line 612, and the output signal (voltage) thereof is led out through the line 592.

The line 542 is connected to the solenoid 280, and the output signal of the bistable memorial circuit 540 is introduced into the solenoid 280 through the line 542.

(6) The component circuits of the electronic computing circuit (6–A) Computing circuitry.—(1) Computing circuit for computing the number of revolutions: The computing circuit 310 for computing the number of revolutions of the hydraulic torque converter pump shaft 11, the computing circuit 320 for computing the number of revolutions of the hydraulic torque converter turbine shaft 14, the computing circuit 330 for computing the number of revolutions of the output shaft 56 are the computing circuits for computing the number of revolutions by taking said signal (voltage) $S_1$, $S_2$, and $S_3$ as inputs respectively, and in regard to the structures thereof, the three are identical.

The structure of said computing circuit for computing the number of revolutions is delineated in FIG. 9 by referring to the computing circuit 310 for computing the number of revolutions of the hydraulic torque converter pump shaft 11 as an example.

The input signal (voltage) $S_1$ is introduced into the computing circuit 310 from line 311, and is amplified by means of the amplifier circuit 313, and the amplitude thereof is determined by the amplitude limiting circuit 314, and the alternating current voltage thereof is converted into direct current voltage with the frequency-DC voltage converting circuit 315 (composed of frequency demodulating rectifier circuit), and the voltage thereof is led out through the line 312.

The voltage wave is shown in FIG. 10 where (a) is the voltage wave of $S_1$, and after the amplification thereof, it takes the same wave.

(b) is the output wave of the amplitude limiting circuit 314.

(c) is the output wave of the frequency-DC voltage converting circuit 315, and the same comprises the wave of the output $[N_1]$ of the computing circuit for computing the number of revolutions and shows that the computation of $N_1=S_1/n_1$ has been carried out.

When the constant of the time constant circuit composed of the resistance and condenser of the frequency demodulating circuit of the frequency-DC voltage converting circuit 315, is changed, the computation of the computing circuit 320 for computing the number of revolutions of the hydraulic torque converter turbine shaft and the computing circuit 330 for computing the number of revolutions of the output shaft, i.e., $N_2=S_2/n_2$, $N_3=S_3/n_3$ can be carried out.

(2) Slip computing circuit: The output signals (voltage) $[N_1]$ and $[N_2]$ of the computing circuits 310 and 320 for computing the number of revolutions are introduced into the four kinds of slip computing circuits 410, 420, 430, and 440 by means of the lines 312, 322.

The structures of these computing circuits are the same.

Figure 11:
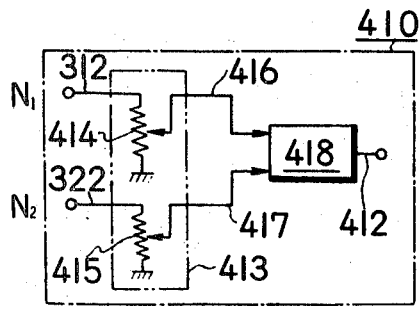
FIG. 11 is a block diagram showing the structure of the slip computing circuit thereof.

The structures of these slip computing circuits are explained in FIG. 11, by taking, as an example, the one in which slip computing circuit ($[N_2/N_1]>0.85$) 410, is electrically contrived.

The line 312 is connected to an end of potentiometer 414 while line 322 is connected to an end of potentiometer 415, the other ends of the respective potentiometers 414 and 415 being grounded.

The intermediate sliding taps 416, 417 of the potentiometers 414 and 415 are connected to the differential amplifier circuit 418 and the output signal thereof is led out line 412.

The computation of slip ratio is the computation of $[N_2/N_1]>0.85$, and this means that the computation of $[N_2]>0.85[N_1]$, i.e., $[N_2]-0.85[N_1]>0$ has been effectuated.

The position of the signal $[N_1]$ introduced from the line 312 is determined by the potentiometer 414 in such a manner that the output voltage of $0.85[N_1]$ is led out on the intermediate sliding tap 416.

On the other hand, the position of the signal $[N_2]$ (introduced form the line 322) is determined by the potentiometer 415 in such a manner that the signal $[N_2]$ becomes the voltage equal to $[N_2]$ on the intermediate sliding tap 417, and that is the position where the line 322 and the intermediate sliding tap 417 are connected.

When said two voltages are introduced into the differential amplifier circuit 418, the computation of the differences between two, i.e., $[N_2]-0.85[N_1]$, can be carried out, and when the result of the computation is in the positive, it is amplified and a determined voltage is led out on the line 412.

When the result of the computation is in the negative, voltage is not led out as an output even if it is amplified.

In other words, when voltage is generated, it shows $[N_2]-0.85[N_1]>0$, which means that $[N_2/N_1]>0.85$ was computed.

On the other hand, when it is $[N_2/N_1]<0.85$, the voltage is not led out as an output.

When $[N_2/N_1]<0.85$ is required, $[N_2]$ is introduced in line 312, and the intermediate sliding tap 416 is connected to the line 312, and $[N_1]$ is introduced in the line 322 and the intermediate sliding tap 417 is provided in such a manner that the signal voltage of $0.85[N_1]$ can be obtained thereon. Thus, $[N_2]-0.85[N_1]<0$, i.e., $[N_2/N_1]<0.85$ is computed.

By appropriately providing the potentiometers and by appropriately selecting intermediate sliding taps, it is also possible to carry out the computation of $[N_2/N_1]>1.20$ and $[N_2/N_1]<0.60$, $[N_2/N_1]<1.10$.

The output signals of the computing circuit are led out as the voltage, on the lines 412, 422, 432 and 442.

(3) Computing circuit for determining the number of revolutions: There are four computing circuits for determining the number of revolutions, i.e., 340, 350, 360, and 370.

These are the computing circuits for detecting whether or not the output signal is generated, depending on whether the input voltages $[N_1]$, $[N_3]$ are larger or smaller than the predetermined values, and the four computing circuits are composed of the same components.

Figure 12:
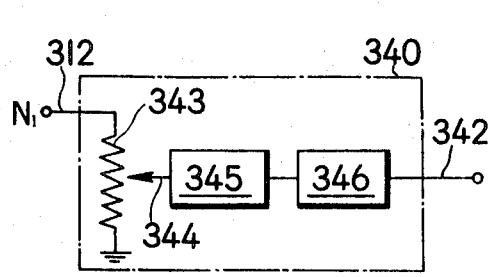
FIG. 12 is a block diagram showing the structure of the r.p.m. determining computing circuit thereof.

As an example of the structure of the computing circuit for determining the number of revolutions, the structure of the computing circuit 340, $([N_1]>1200$ r.p.m.) is shown in FIG. 12.

The voltage $N_1$ showing the number of revolutions $[N_1]$ as the input, introduced through the line 312, is passed into the potentiometer 343, the intermediate sliding tap 344 of which is connected to the standard voltage diode 345 (which can conduct above the standard voltage), and since the diode 345 is connected to the amplifier circuit 346, the output is led out on the line 342.

The value of the voltage $N_1$ introduced into the potentiometer 343 is determined in such a manner that it can be divided into suitable other values through the medium of the intermediate sliding tap 344.

When the voltage of the intermediate sliding tap 344 is increased more than the standard voltage of diode 345, diode 345 sends a signal to the amplifier circuit 346, and said amplifier circuit 346 generates the voltage obtained by the amplification thereof.

On the contrary, when the standard voltage of diode 345 is higher than the voltage developed at the intermediate sliding tap, the output of the voltage signal $N_1$ above referred to is not led out on the line 342.

For example, in the circuit in which, when the intermediate sliding tap 344 of the potentiometer 343 is placed at the position where it is directly connected to the line 312, it is possible to generate the output signal (voltage) on the line 342 at 200 r.p.m., if the determination of $[N_1]>1200$ r.p.m. is desired to be carried out, the intermediate sliding tap 344 is placed at the position $$\frac{200}{1200}$$

from the end of the earth to the effect that the output signal voltage can be sent from the line 342 only when $[N_1]$ is larger than 1200 r.p.m.

On the other hand, in the case of $[N_1]>600$ r.p.m., it is possible to take out the output voltage of $[N_1]>600$ r.p.m. from the line 342 by placing the intermediate sliding tap 344 at the position $$\frac{200}{600}$$

from the end of the earth.

Also it is possible to obtain the output signal (voltage) of $[N_1]<1200$ r.p.m. by containing the phase reversing circuit in the amplifier circuit 346.

Thus it is possible to carry out the computation of $[N_1]>1200$ r.p.m., $[N_1]<600$ r.p.m., $[N_2]>1200$ r.p.m., and $[N_2]<600$ r.p.m.

(6–B) Logic circuitry.—(1) High gear position 580, low gear position 590, NOT-circuit A 610: It is necessary to know whether or not it is in the low gear state or in high gear state as the conditions of speed change.

The voltage applied to the solenoid 280 (i.e., solenoid 280 is conducted) is made to be the signal of the high gear position 580.

When voltage is applied to the solenoid 280, the voltage is erased by the NOT-circuit A 610 (this is a phase reversing circuit and when a signal comes into said circuit 610, voltage does not come out on the output), and when voltage is not applied to the solenoid 280, the output signal voltage comes out.

The output signal voltage of the NOT-circuit A 610 is made to be the signal of the low gear position 590.

As to the gear position signal, any signal for correctly transmitting the position of the speed-change gear, in addition to the above examples, will do, and such a method as to obtain an electric signal from oil pressure operating circuit or a part of the gear train 50 does not go against the spirit of the present invention.

(2) Synchronous time retaining circuit 560: A moment after the solenoid 280 is conducted or immediately after it is non-conducted, the oil pressure operating circuit and the transmission carry out the speed change operation, and should another speed change come at this time, the speed change operation cannot be carried out perfectly, and therefore it is necessary to retain the status quo until said speed change operation is completed.

Figure 13:
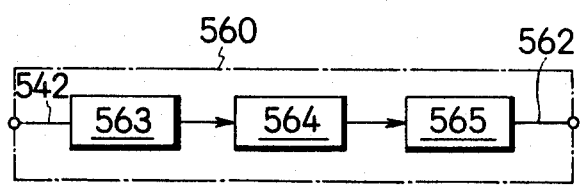
FIG. 13 is a block diagram showing the structure of the synchronous time retaining circuit thereof.

In order to obtain such a signal, synchronous time retaining circuit 560, composed of differential circuit 563, rectifier circuit 564, unistable multi-vibrator 565 (example of which is shown in FIG. 13), is employed.

Figure 14:
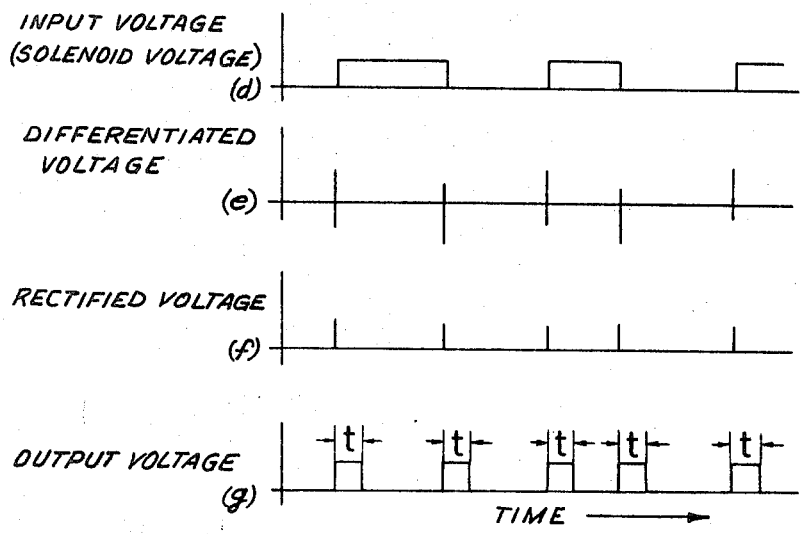
FIG. 14 is a diagram showing the operation voltage wave of the synchronous time retaining circuit thereof.

In regard to the operation thereof, when the voltage, applied to the solenoid 280 (as shown in FIG. 14(d)), is introduced through the line 542, it is differentiated by the differential circuit 563, as is shown in FIG. 14(e), and signals are sent at the time of the change of conduction to non-conduction, or vice-versa. Said signal is rectified by the rectifier circuit 564 as is shown in FIG. 14(f).

The output signal continuing for the time $t$ is sent to the line 562 by tapping on the unistable multivibrator 565 by said signal as is shown in FIG. 14(g).

Said signal (voltage) continuing for the time $t$ is reversely driven with the NOT-circuit B 570 (composed of a phase reversing circuit) in such a manner that said signal is erased for the time $t$ sec. Thus the obtained reversed signal comes out on the line 572.

It is within the spirit of the invention to use a procedure to retain the synchronous time factor, so that after the solenoid is determined to be conductive or non-conductive, the completion of the speed change effectuated by the transmission may be obtained as an electric signal from the suitable portion of the oil pressure operating circuit or the transmission.

(3) AND-circuit: (3.1) AND-circuit A 510.—AND-circuit A 510 is a circuit which is generally called AND-circuit or "logic product" circuit, and generates output signal voltage on the line 512 when $[N_1]>1200$ r.p.m. signal of the computing circuit 340 for determining the number of revolutions, $[N_2/N_1]>0.85$ signal of slip computing circuit 410, $[N_2/N_1]<1.10$ signal of the slip computing circuit 440, $[N_2]>1200$ r.p.m. signal of the computing circuit 360 for determining the number of revolutions, the signal of low gear position 590, and the signal of the NOT-circuit B 570 are simultaneously all present.

(3.2) AND-circuit B 520. · AND-circuit B 520 is also a circuit which is generally called "AND-circuit" or "logic product" circuit, and generates the output signal voltage on the line 522 when the output signal or the OR-circuit 530, the signal of the high gear position 580, and the signal of the NOT-circuit B 570 are simultaneously all present.

(4) OR-circuit 530: OR-circuit 530 is sometimes called logic sum circuit and generates the output signal (voltage) on the line 532 when at least one of the output signals of the computing circuit 350 for determining the number of revolutions, the output signal of the slip computing circuit 420, the output signal of slip computing circuit 430, and the output signal of the computing circuit 370 for determining the number of revolutions, is present.

Figure 15:
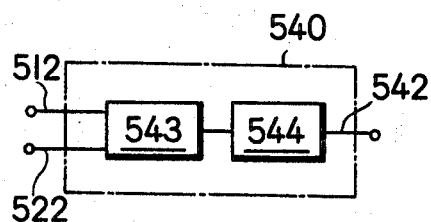
FIG. 15 is a block diagram showing the bistable memorial circuit thereof.

(5) Bistable memory circuit 540: FIG. 15 shows the structure of the bistable memorial circuit 540.

Figure 16:
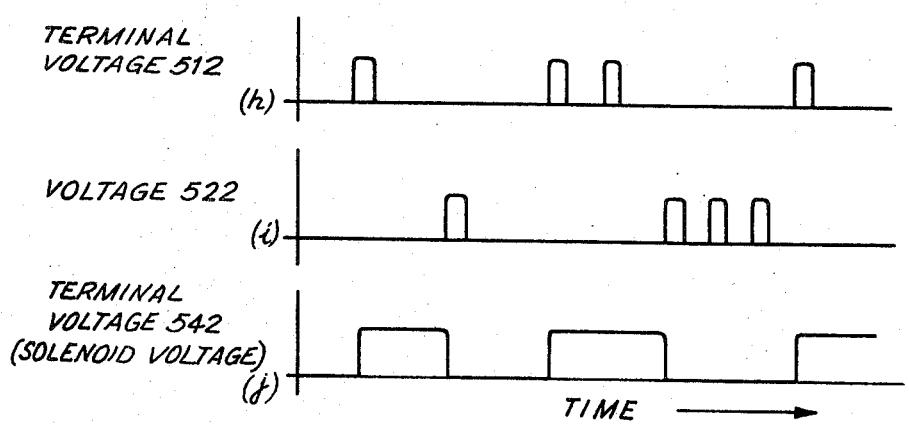
FIG. 16 is a diagram showing the operation voltage wave of the bistable memorial circuit thereof.

The lines 512 and 522 are connected to the input terminal of the bistable multivibrator 543, and when the signal voltage, as is shown in FIG. 16(h), is generated on the line 512, the bistable multivibrator 543 becomes a stabilized state, and the output thereof is amplified by the amplifier circuit 544, and the output voltage thereof comes out on the line 542, and the solenoid 280 is conducted. The output voltage thereof is shown in FIG. 16(j).

When the input signal as is shown in FIG. 16(i) is added into the line 522, bistable multivibrator 543 is stabilized in the reverse stabilized state, and the output thereof is amplified by the amplifier circuit 544, but the output voltage of the amplifier circuit 544 is erased (refer to FIG. 16(j)).

Even if the input signal (voltage) should be erased after the input voltage is introduced into the line 512, for example, the state thereof can be retained and the solenoid 280 will still remain conductive.

When the signal (voltage) should again be led out from the line 512, the conductive state of the solenoid 280 can be retained (refer to third input signal in FIG. 16(h), and second signal in FIG. 16(j)).

(7) Operation of the electronic computing circuit (1) Computation in speed change from low gear state into high gear state.—In regard to the speed change from low gear state into high gear state, it is logically computed when it comes into the speed change range as is shown by the solid line in FIG. 6C, and the solenoid 280 is conductive, the valve shaft 272 of the shift valve is moved to the left, the oil pressure operation circuit is changed into the state of FIG. 4 from the state of FIG. 3, and the gear train 50 is changed from the low gear state into high gear state by the effect of the actuator.

In FIG. 17 through FIG. 22, the circuits where the signal voltage is present in the electronic computing circuit (FIG. 7) are shown by thick solid lines, and the circuits where the signal voltage is not present are shown by the dotted lines.

Figure 17:
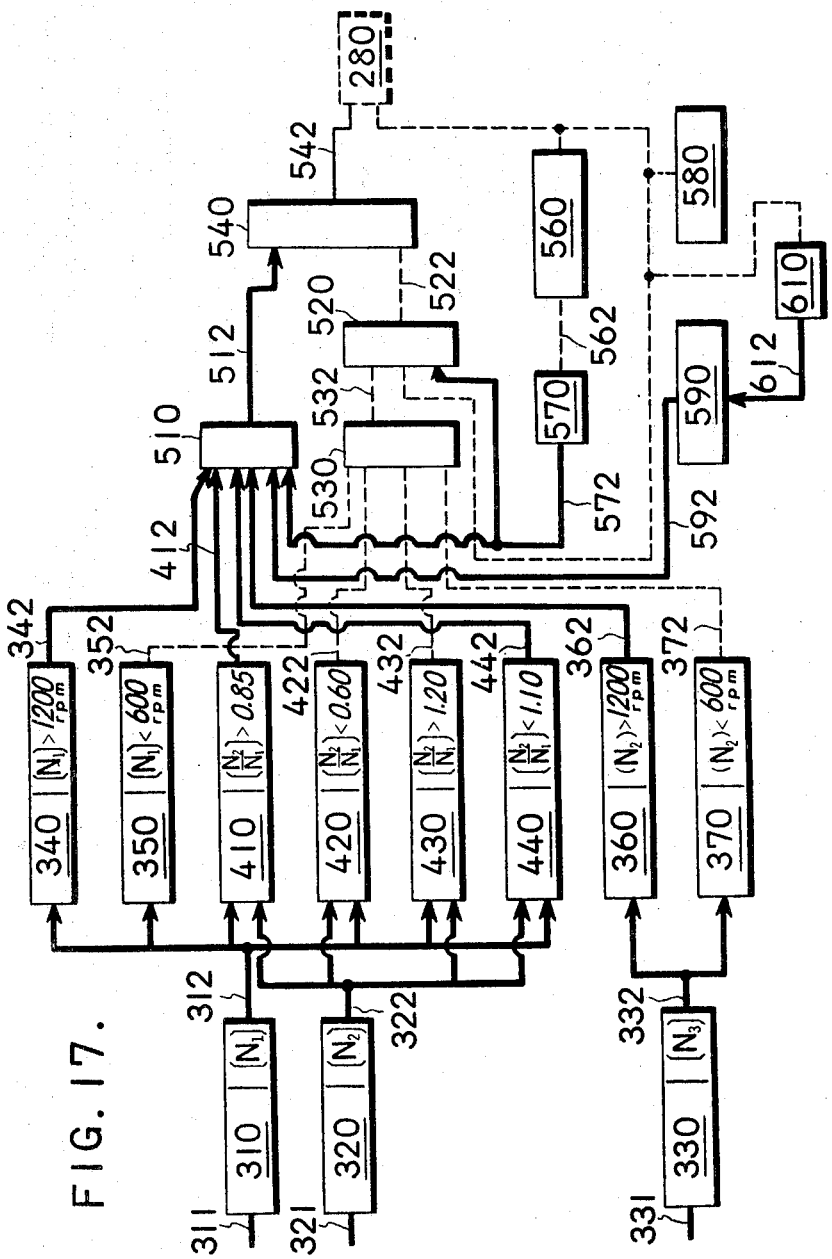
FIG. 17 is a block diagram showing the speed change computation thereof from the low gear state to high gear state.

As shown in FIG. 17, the solenoid 280 is not conductive until the speed change is effectuated, and therefore the signal of the NOT-circuit A 610, i.e., the signal of the low gear position 590 is present, and since there is no signal of the synchronous time retaining circuit 560, the output signal of the NOT-circuit B 570 is present, and these are transmitted to the AND-circuit A 510.

When the number of revolutions of the internal combustion engine are increased and the condition of $[N_1]>1200$ r.p.m. is satisfactory, as the car speed is increased to satisfy the condition of $[N_2]>1200$ r.p.m., and the slip ratio $[N_2/N_1]>0.85$ of the hydraulic torque converter is satisfactory (in this case $[N_2/N_1]<1.10$ is satisfactory), output signals are generated on the respective computing circuits. These signals are introduced into the AND-circuit A 510.

When all the inputs of the AND-circuit A 510 are present, the output signal thereof is generated and is introduced into the bistable memorial circuit 540.

Figure 18:
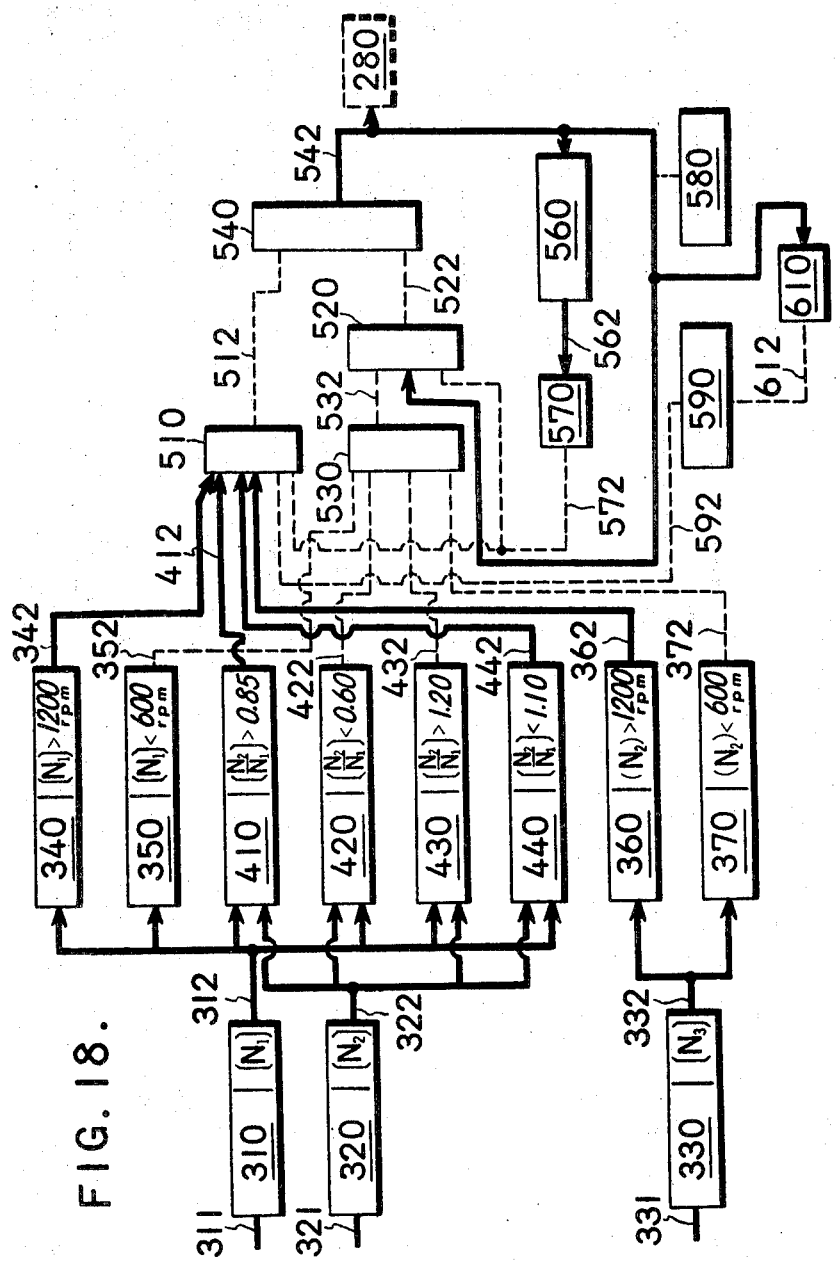
FIG. 18 is a block diagram showing the computation when the synchronous time retaining signal is maintained after speed change is done from low gear state into high gear state.

When the signal is introduced into the bistable memorial circuit 540, it is memorized and stabilized on the conductive side of the solenoid 280, as shown at the right in FIG. 18, and at this time the solenoid 280 being conductive, the speed changing operation of the oil pressure operation circuit and the components of the transmission commences.

The fact that the solenoid 280 is conductive means voltage is applied, and the voltage enters the synchronous time retaining circuit 560 as a signal to generate the signal (voltage) for the time $t$ sec. At that moment the NOT-circuit B 570 erases the then present signals.

On the other hand, the signal of the high gear position 580 is present by the applied voltage of the solenoid 280, and therefore the NOT-circuit A 610 erases the signal of the then present low gear position 590.

Accordingly, the output signal of the AND-circuit A 510 is erased because two signals among the input signals thereof are not present.

However, the bistable memorial circuit 540 retains the given state, and the solenoid 280 therefore remains conductive.

Figure 19:
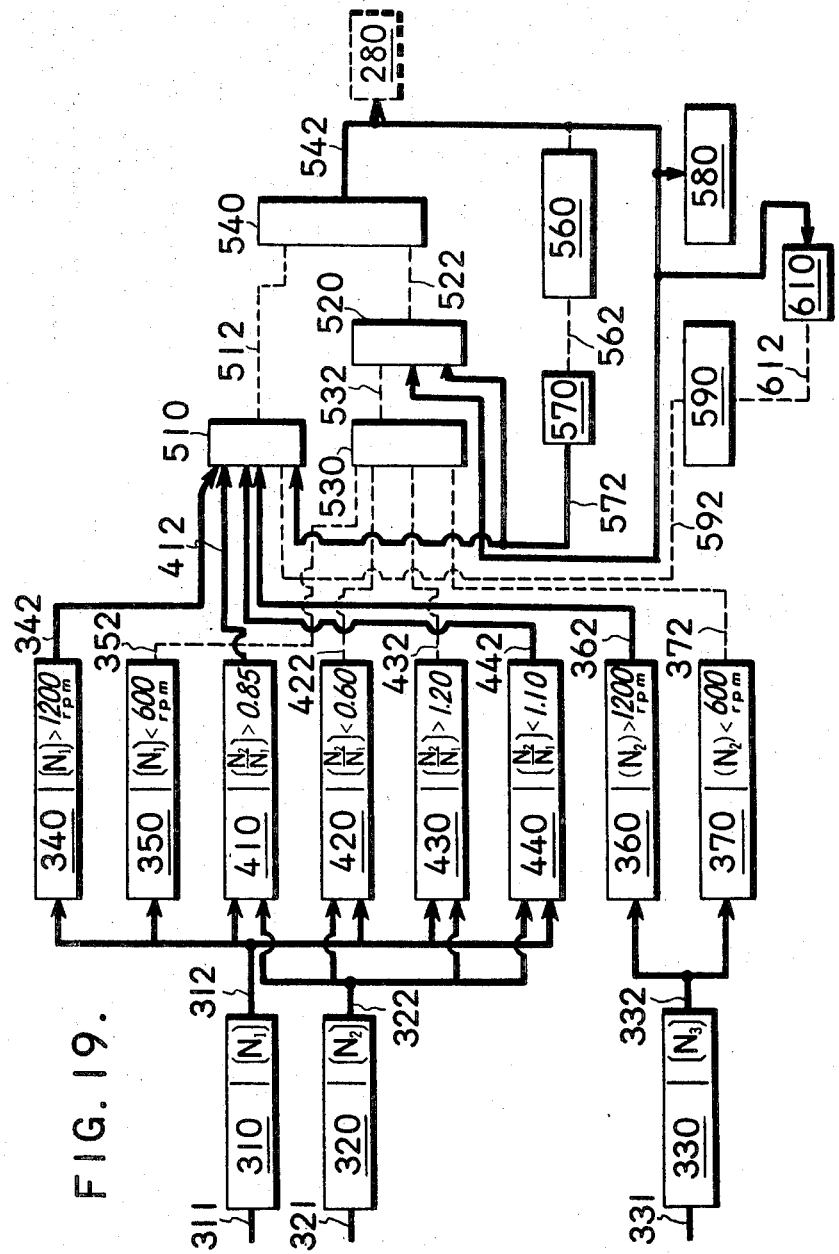
FIG. 19 is a block diagram showing the computation when the synchronous time retaining signal is discontinued after the speed change from low gear state into high gear state.

The synchronous time retaining signal is erased in the time $t$ sec., as shown in FIG. 19, the output signal of the NOT-circuit B 570 is re-generated, said signal and the high gear position signal entering the AND-circuit B 520.

Such a state as shown in FIG. 19 is a modification of the state of logic computation in the electronic computing circuits during the running in the high gear state.

(2) Computation in speed change from high gear state into low gear state.—The speed change from high gear state into the low gear state can be carried out in such a manner that the logical computation is carried out when it goes out of the speed change range shown by the dotted line shown in FIG. 6C, and the conduction to the solenoid 280 is cut off, the valve shaft 272 of the shift valve is moved to the right, the oil pressure operation circuit is changed from the state shown in FIG. 4 into the state shown in FIG. 3, and the gear train 50 is changed from the high gear state into the low gear state by the effect of the actuator.

Figure 20:
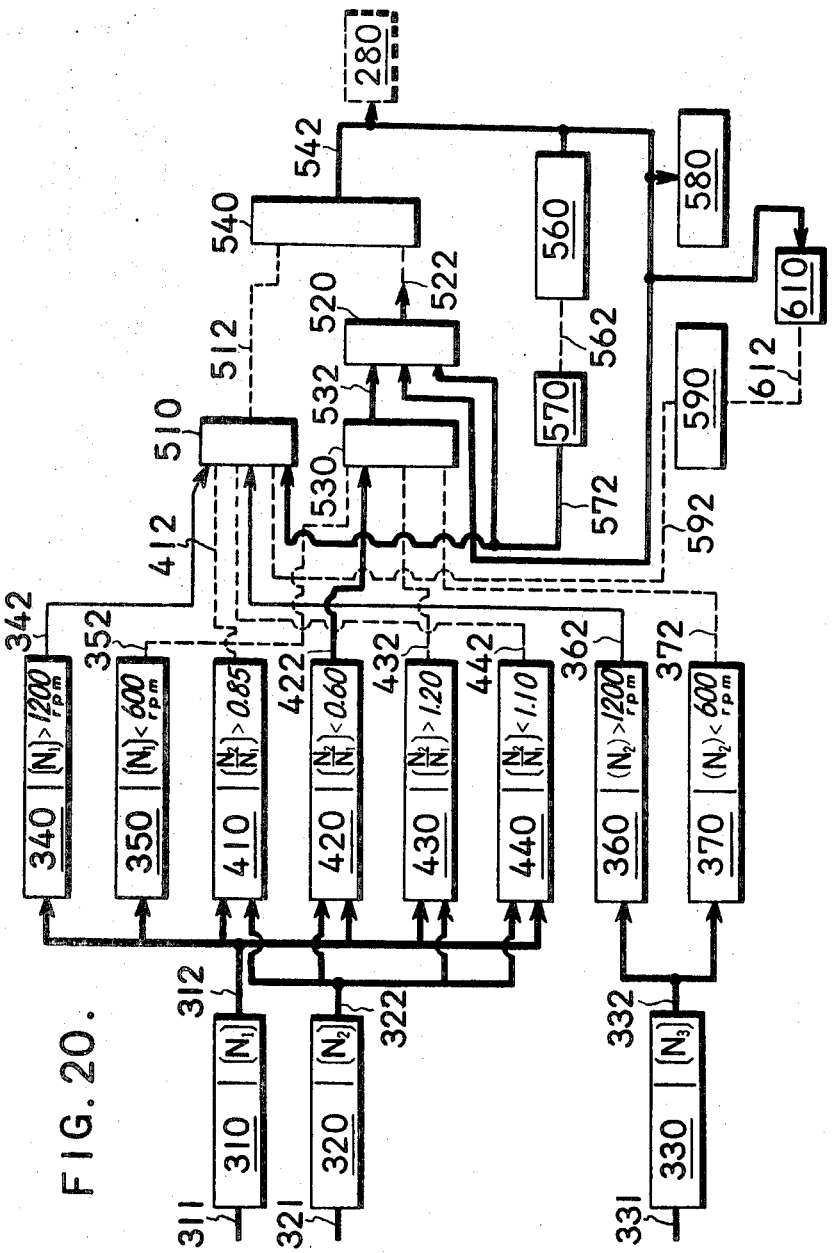
FIG. 20 is a block diagram showing the computation when the slip rate has become below 0.6 in the speed change from high gear state into low gear state.

As shown in FIG. 20, before speed change is carried out, should even one of the input signals of the AND-circuit A 510, such as the signals for determining the number of revolutions, and slip signals be absent, the output signal of the AND-circuit A 510 is erased, but the solenoid 280 remains conductive.

However, the output signal of the NOT-circuit B 570 and the high gear position signal are introduced into the AND-circuit B 520. When the running state of a vehicle is changed, and the slip ratio goes below 0.6 for example, as shown in FIG. 20, the output signal of the slip computing circuit ($[N_2/N_1]<0.60$) 420 is led out, for entry into the OR-circuit 530 and the OR-circuit 530 introduces output signal thereof into the AND-circuit B 520, since the inputs of the AND-circuit B 520 are all present, and the output signal thereof is directly generated and is introduced into the bistable memorial circuit as is shown in FIG. 21, and it is there memorized and stabilized as it is reversed in the other stabilized state, the conductive function of the solenoid 280 is cut off at such time.

In this case, the synchronous time retaining circuit 560 generates the signal for the time $t$ sec., and therefore the NOT-circuit erases the then present signal on the line 572 and as well as the high gear position signal is also erased, thereby erasing the output signal of the AND-circuit B 520.

Figure 22:
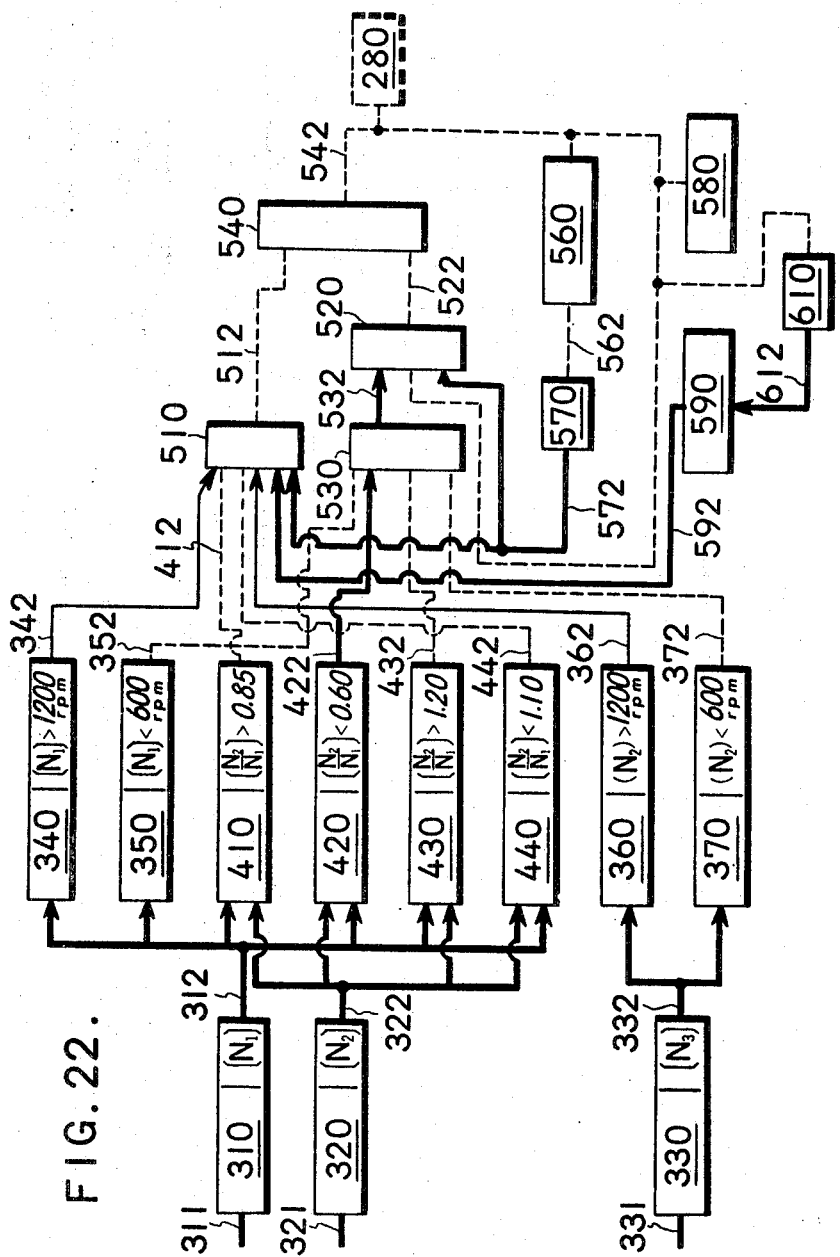
FIG. 22 is a block diagram showing the computation when the synchronous time retaining signal is discontinued after the speed change from high gear state into low gear state.

The state in which the signal of the synchronous time retaining circuit 560 is erased in the time $t$ sec. is a modification during the running of the vehicle the low gear state, i.e., the state in which the signals of NOT-circuit B 570 and the low gear position 590 are introduced into the AND-circuit A 510, as shown in FIG. 22.

Figure 21:
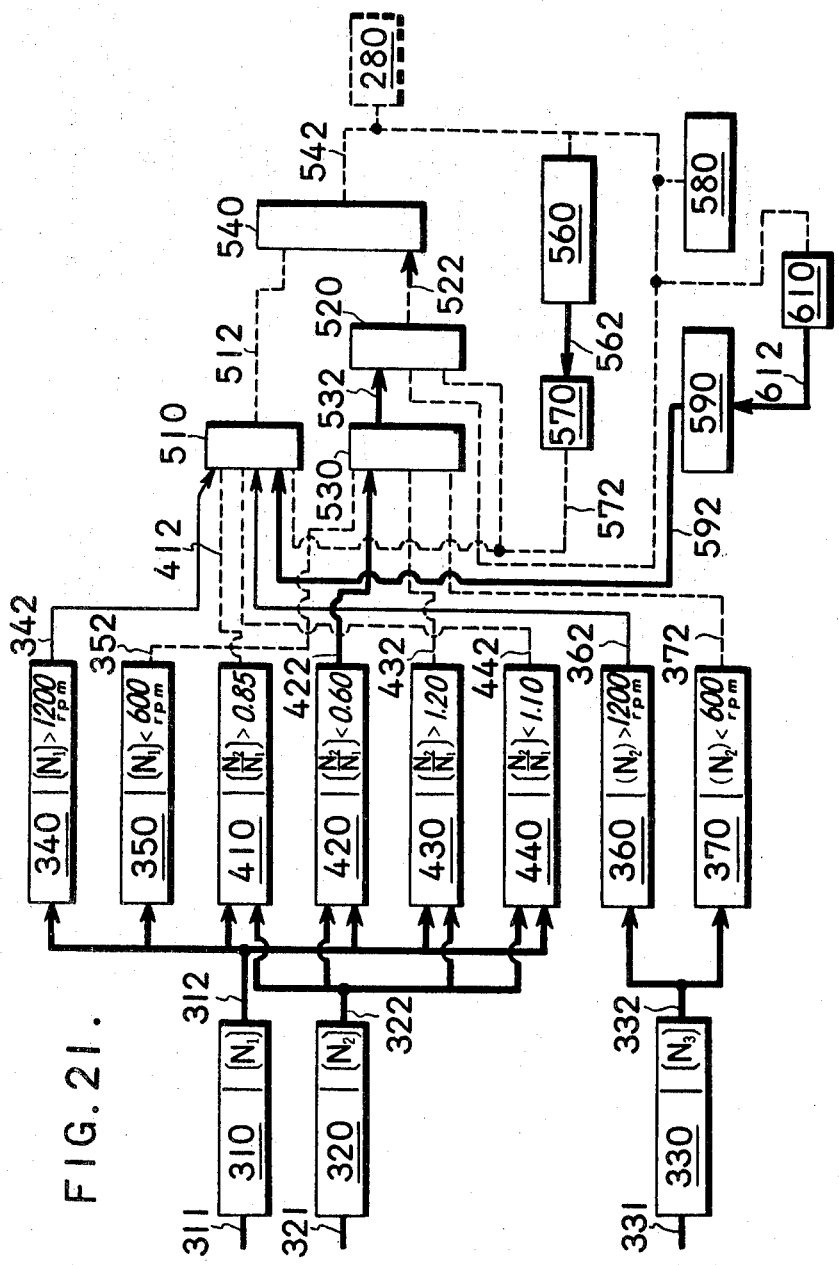
FIG. 21 is a bolck diagram showing the computation when the synchronous time retaining signal is maintained after the speed change is completed from high gear state into low gear state.

In FIGS. 20–22, the signal for determining the number of revolutions ($[N_1]>1200$ r.p.m.) and the signal for determining the number of revolutions ($[N_2]>1200$ r.p.m.) are shown in fine solid lines and since they have no relation to the above-mentioned operations, the explanations have therefore been omitted.

The above are the explanations about the case in which the signal of the slip calculation ($[N_2/N_1]<0.60$) is led out, and when at least one of the other signals such as the output signal of the slip computation $$[N_2/N_1]>1.20$$

and the signals of computations for determining the number of revolutions ($[N_1]<600$ r.p.m.) and the number of revolutions ($[N_2]<600$ r.p.m.) is generated, said signal enters the OR-circuit 530, and exactly the same computation as explained in FIGS. 20 through 22 is carried out, and the speed change from the high gear state into the low gear state can be carried out.

The above are the explanations concerning two-speed gear transmissions as the embodiment of the present invention, but in three-or-more-speed gear transmissions, it can be easily determined from the above-given embodiment that speed change can be carried out from the low gear state into the high gear state, i.e., from first speed gear into the second speed gear, from the second gear into third gear, etc., and from high gear into low gear, i.e., from second gear into first gear, and from third gear into second gear, etc., by carrying out the computation of slip ratio, the computation for determining the number of revolutions of the internal combustion engine, and the computation for determining the number of revolutions showing the vehicle speed, and carrying out the logic computation for the conductive or non-conductive condition of the solenoid by the functions of these signals and by switching one or a plurality of shift valves (the same as 270 or those having the similar function) with one or a plurality of solenoids (the same as 280 or those having the similar function).

(8) Oil pressure operation circuit of forward three-speed automatic transmission In the forward two-speed automatic transmission, as shown in FIG. 1, it is possible to make the forward three-speed transmission by providing the front brake 60 on the clutch drum 31 of the rear clutch 30.

When the front clutch 20, the rear clutch 30 and the rear brake 40, as shown in FIG. 1, and said front brake 60 are combined, and the combination is operated in such a manner as in the following table, the forward three speed gearing can be obtained.

TABLE

| | | Front clutch (20) | Rear clutch (30) | Front brake (60) | Rear brake (40) |
|---|---|---|---|---|---|
| Reverse (R) | | | On | | On |
| Forward | First stage (L) | | On | | On |
| | Second stage (DL) | | On | On | |
| | Third stage (DH) | On | On | | |

Figure 23:
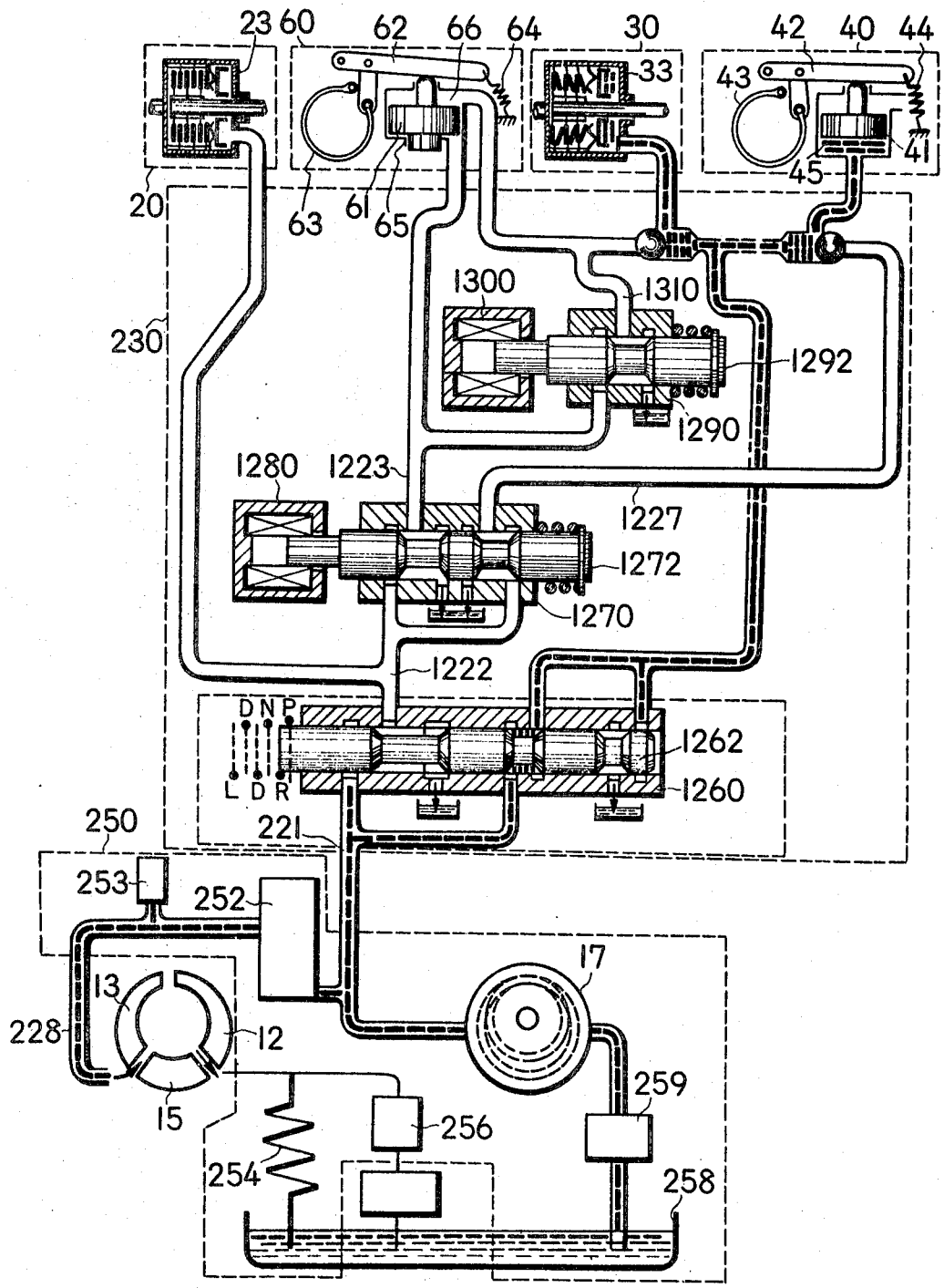
FIG. 23 is a diagram showing the operation of oil pressure operation circuit when this invention is applied to forward three-speed automatic transmission mechanism.

The oil pressure operation circuit used in the preceding transmission is shown in FIG. 23.

FIG. 23 shows the oil pressure arrangement of the second gear (DL), and the structures of the front clutch 20, the rear clutch 30, and the rear brake 40 are the same as those shown in FIG. 1 and FIG. 2, and the front brake 60 is composed of the brake piston 61, the brake link 62, the brake band 63, the return spring 64, the brake cylinder 65 and the release cylinder 66. When the operating oil pressure is given thereto the brake band 63 is operated to fix the second sun gear 57 of the gear train 50 at the position.

In FIG. 23 the oil path 221 to the manual valve 1260 is forked into two branches, and the oil path 1222 from said manual valve 1260 is forked into two branches, one of which is connected to the first shift valve 1270, and the oil path 1223 from said first shift valve 1270 is forked into two branches, one of which is directly connected to the brake cylinder 65 of the front brake 60, and the other of which is connected to the second shift valve 1290, and oil path 1310 from the second shift valve 1290 is connected to the rear clutch 30 and the cylinder 66 of the front brake 60.

The respective shift valves 1270 and 1290 are provided with the solenoid 1280 and 1300 on the valve shafts 1272 and 1292 thereof and the gearing of the forward first stage, the second stage, and the third stage can be attained by the combinations of two solenoids given in the following table:

TABLE

| | Solenoid 1280 | Solenoid 1300 |
|---|---|---|
| First state | | |
| Second stage | Conducted | |
| Third stage | do | Conducted |

The valve shaft 1272 of the first shift valve 1270 is at the position in the left of the diagram by the conduction to the solenoid 1280, and the oil paths 1222 and 1223 are connected, and when the conduction is released, it is moved to the right as shown in the diagram, and the connection between the oil paths 1222 and 1223 is cut off, the oil paths 1222 and 1227 are connected.

When the second shift valve 1290 is at the position as shown in the diagram, the connection between the oil paths 1223 and 1310 is cut off, but when the solenoid 1300 is conductive the valve shaft 1292 is moved to the left, and the oil paths 1223 and 1310 are connected.

(9) Effects

The following is a summary of the effects of the present invention:

(1) The present invention is classified into three groupings, i.e., the transmission by way of hydraulic torque converter, the oil pressure operation circuit, and electronic computing circuit, and in accordance with the present inveniton, the slip ratio of hydraulic torque converter, i.e., the number of revolutions of the internal combustion engine, and the number of revolutions corresponding to the vehicle speed, are computed by an electronic computing circuit to detect the speed change range, and to determine the speed change point, and therefore it is possible to carry out the speed change by the utilization of the efficiency of the internal combustion engine, the running state of the vehicle, and the efficiency of the hydraulic torque converter.

(2) The electronic computing circuitry establishing the speed change condition signals in the form of logic product and logic sum values, and therefore stabilized speed change signals can be attained and control of operation of the transmission and the components thereof to effectuate the computation developed thereby.

(3) The combination of the transmission with hydraulic torque converter, oil pressure operation circuit, and electronic computing circuit, is carried out with the detectors for detecting the number of revolutions of the respective shafts, and the transmission, the oil pressure operation circuit, and electronic computing circuit may be operated by means of solid mechanism, fluid mechanism, electric mechanism or combinations thereof.

What is claimed is:

1. In a variable speed automatic transmission for a vehicle having an engine, a gear unit providing a plurality of different speed gear ratio drives, a hydraulic torque converter having an input and an output interposed therebetween, and friction engaging menas including fluid actuated motors which complete the respective gear ratio drives; the combination of a source of fluid under pressure, delivery conduit means for connecting said source of fluid under pressure with said fluid actuated motors of said friction engaging means including a manual selecting valve for supplying the fluid under pressure to certain of said means, and a distribution valve for selectively supplying fluid under pressure into the fluid activated motors, electrically activatable means for operating said distribution valve, a first detecting device for generating an electric signal in proportion to the revolving velocity of the input shaft of said hydraulic torque converter, a second detecting device for generating an electric signal in proportion to the revolving velocity of a revolving shaft in said gear unit to which the torque is transmitted from the output shaft of said hydraulic torque converter, and a first slip computing circuit which computes the ratio of the revolving velocity of said revolving shaft of said gear unit to the velocity of said input shaft of said hydraulic torque converter by applying the respective electric output signals of said first and second detecting devices as the input signals for generating an electric signal when said ratio of revolving velocity attains a predetermined value, whereby said last named electric signal serves to activate said electrically operable means for operating said distribution valve for supplying fluid under pressure to said motor.

2. In a variable speed automatic transmission for a vehicle, the combination according to claim 1 characterized in that, the revolving shaft whose revolving velocity is detected by said second detecting device, is the input shaft of said gear unit.

3. In a variable speed automatic transmission for a vehicle, the combination according to claim 1 is characterized in that the revolving shaft whose revolving velocity is detected by said second detecting device is the output shaft of said gear unit.

4. In a variable speed automatic transmission for a vehicle, the combination according to claim 1 is characterized, in that there is provided a second slip computing circuit which computes the ratio of the revolving velocity of said revolving shaft of said gear unit to the revolving velocity of said input shaft by applying the respective electric output signals of said first and second detecting devices as the input signals for generating an electric signal when said ratio of revolving velocity attains another predetermined value different from that of the first slip computing circuit, whereby said first slip computing circuit generates an electric output signal when computed ratio by said first circuit becomes higher than said predetermined value, and said second slip computing device generates an electric output signal when computed ratio by said second circuit becomes lower than said predetermined value, said distribution valve being activated by the existence of one of said electrical output signals of said first and second slip computing circutis.

5. In a variable speed automatic transmission for a vehicle, the combination according to claim 1 characterized in that there are provided a computing circuit for determining the number of revolutions which generates an electric signal by applying the output signal of said first detecting device as the input signal when said output signal has reached to a predetermined value, and means for dispatching an electric output signal to said electrically operable means for activating said distribution valve when said output signal from said computing circuit for determining the number of revolutions and said output signal from said slip computing circuit are co-existent.

6. In a variable speed automatic transmission for a vehicle, the combination according to claim 4 characterized in that there are provided two computing circuits for determining the number of revolutions which generate an electric signal respectively by making the output signal of said first detecting device as the input signal when said output signal reaches to a different predetermined value, and means for dispatching an electric output signal to said electrically operable means for activating said distribution valve when one of the output signals generated by said first and second slip computing circuits and one of the output signals generated by said computing circuits for determining the number of revolutions are co-existent.

7. In a variable speed automatic transmission for a vehicle, the combination according to claim 5 is further characterized in that there are provided gear position detecting devices which generate electric output signals for indicating positions of each gear ratio drive of said gear unit respectively when one of said gear ratio drives is selected, and means for dispatching an electric output signal to said electrically operable means for activating said distribution valve when an electric output signal of said gear position detecting devices, an electric output signal of said computing circuit for determining the number of revolutions and an electric output signal of said slip ratio detecting device are co-existent.

8. In a variable speed automatic transmission for a vehicle, the combination according to claim 2 characterized in that there are provided a third detecting device for generating an electric signal in proportion to the revolving velocity of the output shaft of said gear unit, a computing circuit for determining the number of revolutions of the output shaft which generates an electric signal by making the output signal of said third detecting device as the input signal when said output signal of said third detecting device reaches to a predetermined value, and means for dispatching an electric output signal to said electrically operable means for activating said distribution valve when said output signal of said computing circuit for determining the number of revolutions of the output shaft and said output signal of said slip computing circuit are co-existent.

9. In a variable speed automatic transmission for a vehicle, the combination according to claim 4 characterized in that the revolving shaft whose revolving velocity is detected by said second detecting device is the input shaft of said gear unit; and there are provided a third detecting device for generating an electric signal in proportion to the revolving velocity of the output shaft of said gear unit, a computing circuit for determining the number of revolutions of the output shaft which generates an electric signal by making the output signal of said third detecting device as the input signal when said output signal of the third detecting device reaches to a predetermined value, and means for dispatching an electric output signal to said electrically operable means for activating said distribution valve when said output signal of said computing circuit for determining the number of revolutions of the output shaft and output signal of said slip computing circuit are co-existent.

10. In a variable speed automatic transmission for a vehicle, the combination according to claim 9 is further characterized in that there are provided a computing circuit for determining the number of revolutions of the input shaft of said gear unit for generating an electric output signal therefor by applying the output signal of said first detecting device as the input signal of said gear unit when said output signal of said first detecting device reaches a predetermined value, whereby an electric signal to operate said electrically operable means for operating said distribution valve is dispatched when one of said respective electric output signals of said first and second slip computing circuits, the output signal of said computing circuit for determining the number of revolutions of the input shaft and output signal of said computing circuit for determining the number of revolutions of the output shaft of said gear unit are co-existent.

References Cited

UNITED STATES PATENTS

| | | | |
|---|---|---|---|
| 3,354,744 | 11/1967 | Kuhnle et al. | 74—752AZ |
| 3,439,564 | 4/1969 | Scholl et al. | 74—752AZ |
| 3,448,640 | 6/1969 | Nelson | 74—752AZ |

CORNELIUS J. HUSAR, Primary Examiner